United States Patent
Burgess et al.

(10) Patent No.: US 12,555,082 B2
(45) Date of Patent: Feb. 17, 2026

(54) SMART WASTING STATION FOR MEDICATIONS

(71) Applicant: CAREFUSION 303, INC., San Diego, CA (US)

(72) Inventors: Brendan J. Burgess, Poway, CA (US); Magnus R. Felke, San Diego, CA (US); Dugan Joyce, Chula Vista, CA (US); Paul A. Preziotti, Coto de Caza, CA (US); Michael Rahilly, San Diego, CA (US); Hal Schwartz, San Diego, CA (US); Ramkumar Subramanian, San Diego, CA (US); Mustafa Yusufi, Escondido, CA (US)

(73) Assignee: CareFusion 303, Inc., San Diego, CA (US)

( * ) Notice: Subject to any disclaimer, the term of this patent is extended or adjusted under 35 U.S.C. 154(b) by 526 days.

(21) Appl. No.: 16/936,227

(22) Filed: Jul. 22, 2020

(65) Prior Publication Data

US 2021/0027259 A1 Jan. 28, 2021

Related U.S. Application Data

(60) Provisional application No. 62/953,114, filed on Dec. 23, 2019, provisional application No. 62/878,200, filed on Jul. 24, 2019.

(51) Int. Cl.
*G06Q 10/30* (2023.01)
*B65C 3/08* (2006.01)
(Continued)

(52) U.S. Cl.
CPC .............. *G06Q 10/30* (2013.01); *B65C 3/08* (2013.01); *G06F 21/31* (2013.01); *G06Q 50/265* (2013.01); *G16H 40/20* (2018.01); *B09B 2101/65* (2022.01)

(58) Field of Classification Search
CPC ...... G06Q 10/30; G06Q 10/087; G16H 20/10; G16H 40/20; G16H 70/40; G16H 70/20
See application file for complete search history.

(56) References Cited

U.S. PATENT DOCUMENTS

| 4,551,133 A | 11/1985 | Zegers de Beyl et al. |
| 4,693,804 A | 9/1987 | Serwer |

(Continued)

FOREIGN PATENT DOCUMENTS

| AU | 2017 279 693 A1 | 1/2018 |
| AU | 2018335288 B2 | 8/2023 |

(Continued)

OTHER PUBLICATIONS

CareFusion 303 inc granted united states patent for automated waste sorting system. (Oct. 16, 2013). Global IP News.Medical Patent News Retrieved from https://dialog.proquest.com/professional/docview/1492944314?accountid=131444 (Year: 2013).*

(Continued)

*Primary Examiner* — Maria C Santos-Diaz
(74) *Attorney, Agent, or Firm* — Mintz Levin Cohn Ferris Glovsky and Popeo, P.C.

(57) ABSTRACT

Features relating to a wasting station that provides for secure collection, anonymous auditing, and safe disposal of medication are provided. The wasting station securely receives and stores wasted medication for later analysis. The wasting system may provide for waste containers that may include electronic tags, biomarkers, and/or reagents that may be used to analyze waste items. The wasting system may include support for witnessing the wasting process, either locally or remotely.

20 Claims, 14 Drawing Sheets

(51) Int. Cl.
*G06F 21/31* (2013.01)
*G06Q 50/26* (2024.01)
*G16H 40/20* (2018.01)
*B09B 101/65* (2022.01)

(56) References Cited

U.S. PATENT DOCUMENTS

| | | | |
|---|---|---|---|
| 5,945,651 A | 8/1999 | Chorosinski et al. | |
| 5,961,036 A | 10/1999 | Michael et al. | |
| 5,991,731 A * | 11/1999 | Colon | G16H 10/20 |
| | | | 705/2 |
| 6,113,578 A | 9/2000 | Brown | |
| 6,650,964 B2 | 11/2003 | Spano, Jr. et al. | |
| 6,671,579 B2 | 12/2003 | Spano, Jr. et al. | |
| 6,842,736 B1 | 1/2005 | Brzozowski | |
| 6,868,344 B1 | 3/2005 | Nelson | |
| 7,119,689 B2 | 10/2006 | Mallett et al. | |
| 7,184,897 B2 | 2/2007 | Nelson | |
| 7,275,645 B2 | 10/2007 | Mallett et al. | |
| 7,303,081 B2 | 12/2007 | Mallett et al. | |
| 7,311,207 B2 | 12/2007 | Mallett et al. | |
| 7,318,529 B2 | 1/2008 | Mallett et al. | |
| 7,562,025 B2 | 7/2009 | Mallett et al. | |
| 7,693,603 B2 | 4/2010 | Higham | |
| 8,147,479 B1 | 4/2012 | Wach et al. | |
| 8,195,328 B2 | 6/2012 | Mallett et al. | |
| 8,280,550 B2 | 10/2012 | Levy et al. | |
| 8,319,669 B2 | 11/2012 | Weller | |
| 8,357,114 B2 | 1/2013 | Poutiatine et al. | |
| 8,560,460 B2 * | 10/2013 | Mallett | B07C 5/3412 |
| | | | 705/308 |
| 8,595,021 B2 | 11/2013 | Mallett et al. | |
| 8,606,596 B1 * | 12/2013 | Bochenko | G06Q 10/00 |
| | | | 705/2 |
| 8,725,532 B1 | 5/2014 | Ringold | |
| 8,738,177 B2 | 5/2014 | van Ooyen et al. | |
| 8,768,724 B2 | 7/2014 | Whiddon et al. | |
| 8,905,964 B2 | 12/2014 | Poutiatine et al. | |
| 9,056,165 B2 | 6/2015 | Steil et al. | |
| 9,158,892 B2 | 10/2015 | Levy et al. | |
| 9,202,052 B1 | 12/2015 | Fang et al. | |
| 9,227,025 B2 | 1/2016 | Butterfield et al. | |
| 9,354,178 B2 | 5/2016 | Lee | |
| 9,427,520 B2 | 8/2016 | Batch et al. | |
| 9,456,958 B2 | 10/2016 | Reddy et al. | |
| 9,523,635 B2 | 12/2016 | Tilden | |
| 9,636,273 B1 | 5/2017 | Harris | |
| 9,752,935 B2 | 9/2017 | Marquardt et al. | |
| 9,796,526 B2 | 10/2017 | Smith et al. | |
| 9,817,850 B2 | 11/2017 | Dubbels et al. | |
| 9,836,485 B2 | 12/2017 | Dubbels et al. | |
| 9,842,196 B2 | 12/2017 | Utech et al. | |
| 9,881,129 B1 | 1/2018 | Cave | |
| 9,958,324 B1 | 5/2018 | Marquardt et al. | |
| 10,032,344 B2 | 7/2018 | Nelson et al. | |
| 10,101,269 B2 | 10/2018 | Judge et al. | |
| 10,187,288 B2 | 1/2019 | Parker et al. | |
| 10,209,176 B2 | 2/2019 | Proskurowski et al. | |
| 10,241,038 B2 | 3/2019 | Nishimura et al. | |
| 10,249,153 B2 | 4/2019 | Nelson et al. | |
| 10,309,832 B2 | 6/2019 | Marquardt et al. | |
| 10,345,242 B2 | 7/2019 | Zhao et al. | |
| 10,569,015 B2 | 2/2020 | Estes | |
| 10,580,525 B2 | 3/2020 | Adams et al. | |
| 10,832,207 B2 | 11/2020 | Vahlberg et al. | |
| 11,037,666 B1 | 6/2021 | Benoit et al. | |
| 11,116,892 B2 | 9/2021 | Brady et al. | |
| 11,147,914 B2 | 10/2021 | Estes | |
| 11,481,739 B1 * | 10/2022 | McKinzie | G01G 19/52 |
| 2003/0158751 A1 | 8/2003 | Suresh et al. | |
| 2003/0167190 A1 | 9/2003 | Rincavage et al. | |
| 2005/0165559 A1 * | 7/2005 | Nelson | G16H 20/10 |
| | | | 702/27 |
| 2005/0277873 A1 | 12/2005 | Stewart et al. | |
| 2006/0047538 A1 | 3/2006 | Conduros et al. | |
| 2006/0064053 A1 | 3/2006 | Bollish et al. | |
| 2007/0260487 A1 * | 11/2007 | Bartfeld | G06Q 30/018 |
| | | | 600/300 |
| 2008/0059226 A1 | 3/2008 | Melker et al. | |
| 2008/0082360 A1 | 4/2008 | Bailey et al. | |
| 2008/0140715 A1 | 6/2008 | Hakos | |
| 2008/0243055 A1 | 10/2008 | Fathallah et al. | |
| 2008/0288430 A1 | 11/2008 | Friedlander et al. | |
| 2008/0306796 A1 | 12/2008 | Zimmerman et al. | |
| 2008/0319795 A1 | 12/2008 | Poteet et al. | |
| 2009/0083231 A1 | 3/2009 | Eberholst et al. | |
| 2009/0160646 A1 | 6/2009 | Mackenzie et al. | |
| 2010/0169063 A1 | 7/2010 | Yudkovitch et al. | |
| 2010/0213250 A1 * | 8/2010 | Mallett | A61B 50/13 |
| | | | 235/375 |
| 2010/0271218 A1 | 10/2010 | Hoag et al. | |
| 2011/0016110 A1 | 1/2011 | Egi et al. | |
| 2011/0082440 A1 | 4/2011 | Kimmo et al. | |
| 2011/0161108 A1 | 6/2011 | Miller et al. | |
| 2012/0173440 A1 * | 7/2012 | Dehlinger | A61B 90/96 |
| | | | 705/308 |
| 2012/0226447 A1 | 9/2012 | Nelson et al. | |
| 2012/0265336 A1 * | 10/2012 | Mallett | A61L 11/00 |
| | | | 700/236 |
| 2012/0305132 A1 | 12/2012 | Maness | |
| 2012/0325330 A1 | 12/2012 | Prince et al. | |
| 2013/0002429 A1 | 1/2013 | Johnson | |
| 2013/0018356 A1 * | 1/2013 | Prince | G06Q 10/0833 |
| | | | 604/506 |
| 2013/0070090 A1 | 3/2013 | Bufalini et al. | |
| 2013/0144254 A1 | 6/2013 | Amirouche et al. | |
| 2013/0253291 A1 | 9/2013 | Dixon et al. | |
| 2013/0253700 A1 | 9/2013 | Carson et al. | |
| 2013/0262138 A1 | 10/2013 | Jaskela et al. | |
| 2013/0282392 A1 | 10/2013 | Wurm | |
| 2013/0325727 A1 | 12/2013 | MacDonell et al. | |
| 2014/0074284 A1 | 3/2014 | Czaplewski et al. | |
| 2014/0081652 A1 | 3/2014 | Klindworth | |
| 2014/0149131 A1 | 5/2014 | Bear et al. | |
| 2014/0214199 A1 * | 7/2014 | Utech | G06F 17/00 |
| | | | 700/236 |
| 2014/0249776 A1 | 9/2014 | King et al. | |
| 2014/0277707 A1 | 9/2014 | Akdogan et al. | |
| 2014/0375324 A1 | 12/2014 | Matsiev et al. | |
| 2015/0038898 A1 | 2/2015 | Palmer et al. | |
| 2015/0061832 A1 | 3/2015 | Pavlovic et al. | |
| 2015/0081324 A1 | 3/2015 | Adjaoute | |
| 2015/0109437 A1 | 4/2015 | Yang et al. | |
| 2015/0161558 A1 | 6/2015 | Gitchell et al. | |
| 2015/0221086 A1 | 8/2015 | Bertram | |
| 2015/0272825 A1 | 10/2015 | Lim et al. | |
| 2015/0286783 A1 | 10/2015 | Kumar et al. | |
| 2015/0294079 A1 | 10/2015 | Bergougnan | |
| 2015/0323369 A1 | 11/2015 | Marquardt | |
| 2015/0339456 A1 | 11/2015 | Sprintz | |
| 2015/0362350 A1 | 12/2015 | Miller et al. | |
| 2016/0034274 A1 | 2/2016 | Diao et al. | |
| 2016/0062371 A1 | 3/2016 | Davidian et al. | |
| 2016/0117478 A1 | 4/2016 | Hanina et al. | |
| 2016/0161705 A1 | 6/2016 | Marquardt et al. | |
| 2016/0166766 A1 | 6/2016 | Schuster et al. | |
| 2016/0259904 A1 | 9/2016 | Wilson | |
| 2016/0259911 A1 | 9/2016 | Koester | |
| 2016/0283691 A1 | 9/2016 | Ali | |
| 2016/0346469 A1 | 12/2016 | Shubinsky et al. | |
| 2017/0017760 A1 | 1/2017 | Freese et al. | |
| 2017/0032102 A1 | 2/2017 | Skoda | |
| 2017/0076065 A1 | 3/2017 | Darr et al. | |
| 2017/0083681 A1 | 3/2017 | Sprintz et al. | |
| 2017/0103203 A1 | 4/2017 | Sharma et al. | |
| 2017/0108480 A1 | 4/2017 | Clark et al. | |
| 2017/0109480 A1 * | 4/2017 | Vahlberg | G07F 9/002 |
| 2017/0109497 A1 | 4/2017 | Tribble et al. | |
| 2017/0120035 A1 | 5/2017 | Butterfield et al. | |
| 2017/0199983 A1 | 7/2017 | Cano et al. | |
| 2018/0028408 A1 | 2/2018 | Li et al. | |
| 2018/0039736 A1 | 2/2018 | Williams | |
| 2018/0046651 A1 | 2/2018 | Dubbels et al. | |
| 2018/0157803 A1 | 6/2018 | Mirov | |

(56) References Cited

U.S. PATENT DOCUMENTS

| | | |
|---|---|---|
| 2018/0165417 A1 | 6/2018 | Hall et al. |
| 2018/0192942 A1 | 7/2018 | Clark et al. |
| 2018/0203978 A1 | 7/2018 | Basu et al. |
| 2018/0231415 A1 | 8/2018 | Marquardt et al. |
| 2018/0247703 A1 | 8/2018 | D'Amato |
| 2018/0259446 A1 | 9/2018 | Coffey et al. |
| 2018/0299375 A1 | 10/2018 | Young et al. |
| 2018/0330824 A1 | 11/2018 | Athey et al. |
| 2018/0365385 A1 | 12/2018 | Cooney et al. |
| 2018/0365386 A1 | 12/2018 | Vanderveen |
| 2019/0088354 A1 | 3/2019 | Yanowitz et al. |
| 2019/0117883 A1 | 4/2019 | Abrams et al. |
| 2019/0124118 A1 | 4/2019 | Swafford |
| 2019/0139638 A1 | 5/2019 | Keefe et al. |
| 2019/0180862 A1 | 6/2019 | Wisser et al. |
| 2019/0206540 A1* | 7/2019 | Agassi .................. G16H 20/13 |
| 2019/0244699 A1 | 8/2019 | Loebig et al. |
| 2019/0247703 A1 | 8/2019 | Welde et al. |
| 2019/0341142 A1 | 11/2019 | Nag et al. |
| 2019/0355461 A1 | 11/2019 | Kumar et al. |
| 2019/0369580 A1* | 12/2019 | Garg .................. G07F 17/0092 |
| 2020/0051363 A1* | 2/2020 | Garg .................. G07F 17/0092 |
| 2020/0085686 A1 | 3/2020 | Aliakbarian et al. |
| 2020/0098474 A1 | 3/2020 | Vanderveen |
| 2020/0219611 A1 | 7/2020 | Nag et al. |
| 2020/0222627 A1 | 7/2020 | Guerra et al. |
| 2020/0230316 A1 | 7/2020 | Guerra et al. |
| 2020/0312442 A1* | 10/2020 | Hairr ..................... G16H 40/20 |
| 2020/0402632 A1* | 12/2020 | van Schelven ........ G06Q 10/30 |
| 2021/0005324 A1 | 1/2021 | Bostic et al. |
| 2021/0133201 A1 | 5/2021 | Tribble et al. |
| 2021/0308385 A1 | 10/2021 | Nisha et al. |
| 2022/0005574 A1 | 1/2022 | Kühn |
| 2022/0062964 A1 | 3/2022 | VanDerWoude et al. |
| 2022/0093239 A1 | 3/2022 | Nag et al. |
| 2022/0254470 A1* | 8/2022 | Lafauci .............. G06Q 10/0631 |

FOREIGN PATENT DOCUMENTS

| | | | |
|---|---|---|---|
| CA | 2527412 A1 | 5/2006 | |
| CA | 2561239 C | 2/2010 | |
| CA | 2 636 115 C | 6/2014 | |
| CA | 2 848 274 C | 9/2016 | |
| CN | 106687960 A | 5/2017 | |
| CN | 108292523 A | 7/2018 | |
| CN | 110265108 A | 9/2019 | |
| EP | 1 973 593 B1 | 4/2013 | |
| EP | 1 593 076 B1 | 10/2019 | |
| JP | 2007-304654 A | 11/2007 | |
| JP | 2016-517077 A | 6/2016 | |
| JP | 2018-181340 A | 11/2018 | |
| KR | 10-2014-0129141 A | 11/2014 | |
| WO | WO-2006/034367 A2 | 3/2006 | |
| WO | WO-2010/058796 A1 | 5/2010 | |
| WO | WO-2011/014517 A1 | 2/2011 | |
| WO | WO-2011035277 A1 * | 3/2011 | ............ A61B 50/36 |
| WO | WO-2011/039676 A2 | 4/2011 | |
| WO | WO-2014/055925 A1 | 4/2014 | |
| WO | WO-2015/187682 A1 | 12/2015 | |
| WO | WO-2019/028004 A1 | 2/2019 | |
| WO | WO-2019/031331 A1 | 2/2019 | |
| WO | WO-2020/163465 A1 | 8/2020 | |
| WO | WO-2020/206154 A1 | 10/2020 | |
| WO | WO-2020/251962 A1 | 12/2020 | |

OTHER PUBLICATIONS

F. Noonan, S. Maharjan, A. Shields, D. Riordan, J. Walsh and P. Doody, "Automation of a paper-based waste tracking system," 2018 2nd International Symposium on Small-scale Intelligent Manufacturing Systems (SIMS), Cavan, Ireland, 2018, pp. 1-5, doi: 10.1109/SIMS.2018.8355290. (Year: 2018).*

S. Mdukaza, B. Isong, N. Dladlu and A. M. Abu-Mahfouz, "Analysis of IoT-Enabled Solutions in Smart Waste Management," IECON 2018—44th Annual Conference of the IEEE Industrial Electronics Society, Washington, DC, USA, 2018, pp. 4639-4644, doi: 10.1109/IECON.2018.8591236. (Year: 2018).*

Qui et al. (2016) "A survey of machine learning for big data processing." *EURASIP Journal on Advances in Signal Processing*, Article No. 67, 16 pages.

Yang, J., McAuley, J.J., & Leskovec, J. (2013). "Community Detection in Networks with Node Attributes." 2013 IEEE 13th International Conference on Data Mining, 1151-1156.

Benjamin, X.C. et al. (2012). "Visual identification of medicine boxes using features matching." *IEEE International Conference on Virtual Environments Human-Computer Interfaces and Measurement Systems (VECIMS) Proceedings*, 43-47. Doi: 10.1109/VECIMS.2012.6273190.

Cakaloglu, T. (Nov. 1, 2017). "Medi-Deep: Deep control in a medication usage." *2017 IEEE International Conference of Bioinfomratice and Biomedicine (BIBM)*, 899-904. Doi: 10.1109/BIBM.2017.8217776.

Neuman, M.R. et al. (May 13, 2012), "Advances in Medical Devices and Medical Electronics," in Proceedings of the IEEE, vol. 100, No. Special Centennial Issue, pp. 1537-1550,doi: 10.1109/JPROC.2012.2190684.

Shishvan, O. Rajabi et al. (2018). "Machine Intelligence in Healthcare and Medical Cyber Physical Systems: A Survey." *IEEE Access*. vol. 6, 46419-46494. doi: 10.1109/ACCESS.2018.2866049.

Uniyal, D. et al. (Nov. 7, 2014), "Pervasive Healthcare—A Comprehensive Survey of Tools and Techniques," arXiv:1411.1821v1, 48 pages.

Yaniv, Z. et al. (Oct. 1, 2016). "The National Library of Medicine Pill Image Recognition Challenge: An Initial Report." *Oct. 2016 IEEE Applied Imagery Pattern Recognition Workshop, (AIPR)*, 1-9. Doi: 10.1109/AIPR.2016.8010584.

Zhan, A. et al. (Jan. 5, 2016) "High Frequency Remote Monitoring of Parkinson's Disease via Smartphone: Platform Overview and Medication Response Detection," Retrieved Apr. 29, 2021. 12 pages.

Svendsen, K. et al. (2011). "Choosing the Unit of Measurement Counts: The Use of Oral Morphine Equivalents in Studies of Opioid Consumption Is a Useful Addition to Defined Daily Doses." Palliative Medicine, vol. 25, No. 7, Oct. 2011, pp. 725-732. DOI.org Crossref), https://doi.org/10.1177/0269216311398300. (Year: 2011).

* cited by examiner

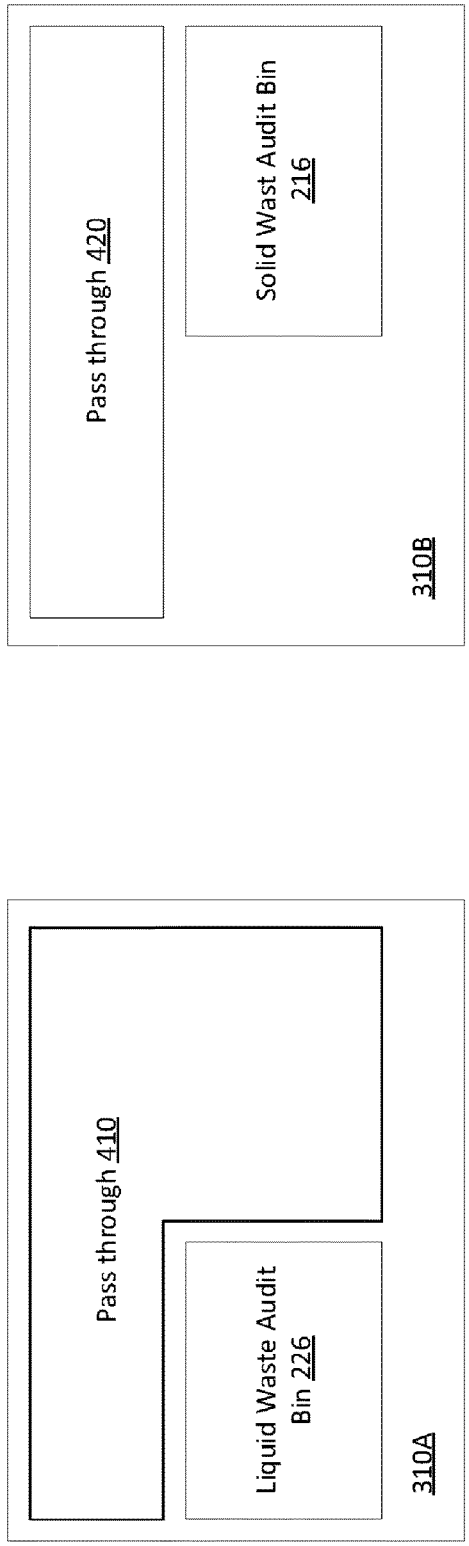
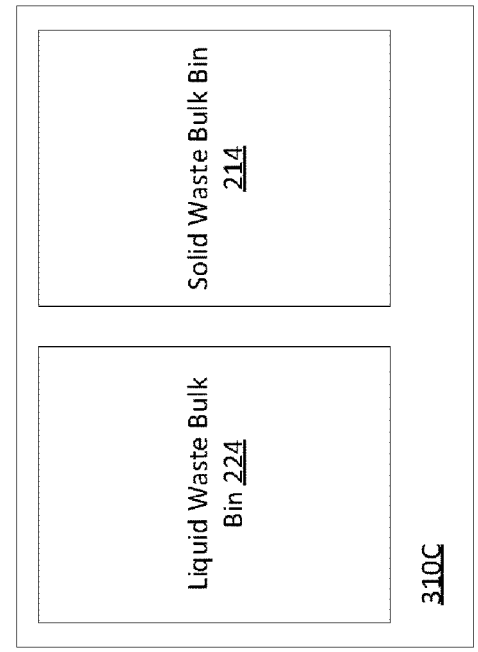
FIG. 4B
FIG. 4C
FIG. 4A

SMART WASTING STATION FOR MEDICATIONS

CROSS-REFERENCE TO RELATED APPLICATIONS

This application claims priority to U.S. Provisional Patent Application 62/878,200 filed Jul. 24, 2019, entitled "SMART WASTING STATION FOR MEDICATION" and U.S. Provisional Patent Application 62/953,114 filed Dec. 23, 2019, entitled "SMART WASTING STATION FOR MEDICATION," the contents of both applications are hereby incorporated by reference in their entirety.

TECHNICAL FIELD

The subject matter described herein relates generally to secure disposal and/or wasting of medications.

BACKGROUND

Diversion may refer to the transfer of a medication or a controlled substance to a third party who is not legally authorized to receive, possess, and/or consume the controlled substance. For example, rather than properly disposing of unused medication, a clinician may illegally keep all or some of the medication for their own personal use. High-value and/or controlled prescription medications, notably opioids, may be especially prone to diversion. For instance, prescription medications may be diverted while being loaded into and/or retrieved from a dispensing cabinet. Some prescription medications, such as morphine, hydromorphone, fentanyl, and/or the like, may be administered to a patient via a pump, for example, a patient-controlled analgesic (PCA) pump, that is capable of holding more doses of the prescription medication than is needed by the patient or administering partial doses for a patient. The extra or residual doses of prescription medication may be susceptible to being diverted by the clinicians. For example, some of the prescription medication may be removed before being loaded into the pump. Alternatively and/or additionally, prescription medication that remains in the pump may be held back instead of properly disposed of at a wasting site.

SUMMARY

Aspects of the current subject matter relate to the disposal or wasting of medications and auditing the disposal or wasting of medications.

According to aspects of the current subject matter, a computer-implemented method includes authenticating, by a processing unit associated with a wasting station, a user; determining, by the processing unit, an audit type for a medication to be deposited by the user and collected by the wasting station, wherein the audit type may be determined based on a set of predefined rules defined for the wasting station and/or the user; enabling, by the processing unit, access to a deposit point of the wasting station; enabling, by the processing unit, collection of the medication from the deposit point to a particular container of a plurality of containers, wherein the particular container may be based on the audit type; and creating, by the processing unit, a record of the collection of the medication.

In some variations, one or more of the features disclosed herein, including the following features, can optionally be included in any feasible combination. The authentication of the user may include verifying an identity of the user as an authorized user. The authentication may further include identifying an access level of the user. The audit type may define whether the medication is subject to an audit. The set of predefined rules may define one or more criteria related to the wasting station and/or the user for determining whether the medication is subject to the audit. The one or more criteria may include a frequency of use, one or more attributes associated with the user, a list of at-risk users, a medication type of the medication, a length of time since the medication was dispensed, a time of day, and/or a day of the week. The set of predefined rules may include a random auditing rule for determining if the medication is subject to the audit. The deposit point may be selected from a plurality of deposit points based on a medication type of the medication. A medication type of the medication may be associated with the user. The computer-implemented method may further include determining, by the processing unit, the medication type, wherein the determination may include receiving, by the processing unit, a medication identifier associated with the medication, wherein the medication type may be linked to the medication identifier. Receiving the medication identifier may include receiving a medication identifier code from a scanning device associated with the wasting station. The audit type may further be based on a medication type of the medication. The computer-implemented method may further include enabling, by the processing unit, access to a waste container, wherein the waste container may be deposited at the deposit point for the collection of the medication. The enablement of access to the waste container may include dispensing, from the wasting station, the waste container. The waste container may include a container identifier code. The computer-implemented method may further include receiving, by the processing unit, the container identifier code from a scanning device associated with the wasting station. The enablement of access to the deposit point of the wasting station may include providing an opening to the deposit point for depositing the medication. The enablement of collection of the medication may include opening a pathway from the deposit point to the particular container for directing the medication to the particular container. The computer-implemented method may further include determining, by the processing unit, collection of the medication at the particular container; and securing, by the processing unit and based on the determination of the collection of the medication, the deposit point, wherein the securing may prevent access to the deposit point. The computer-implemented method may further include providing, by the processing unit and in response to verification of an authorized personnel, access to the plurality of containers. The computer-implemented method may further include analyzing, by the processing unit, the collected medication. The computer-implemented method may further include incorporating, by the processing unit and to the record, an analysis result of the collected medication. The wasting station may include a user interface, wherein the user interface may provide information and/or instructions related to the authentication, the deposit point, the collection of the medication, and/or the record of the collection of the medication. The wasting station may be part of a medication dispensing station. The wasting station may further include a load cell. The computer-implemented method may further include obtaining, by the processing unit and from the load cell, a measurement associated with the particular container, comparing, by the processing unit, the measurement and a fill threshold associated with the particular container, and in response determining that the measurement meets the fill threshold associated with the particular container, preventing, by the processing unit, further waste from being directed to the particular container.

In an inter-related aspect, a system includes a wasting station configured to receive and collect medication; at least one data processor associated with the wasting station; and at least one memory storing instructions which, when executed by the at least one data processor, result in operations including authenticating a user; determining an audit type for the medication to be deposited by the user and collected by the wasting station, wherein the audit type may be determined based on a set of predefined rules defined for the wasting station and/or the user; enabling access to a deposit point of the wasting station; enabling collection of the medication from the deposit point to a particular container of a plurality of containers, wherein the particular container may be based on the audit type; and creating a record of the collection of the medication.

In some variations, one or more of the features disclosed herein, including the following features, can optionally be included in any feasible combination. The wasting station may be communicatively coupled with a witnessing client, wherein the witnessing client may provide for remote monitoring at the wasting station. The wasting station may include a container dispenser configured to dispense a waste container to hold the medication. The wasting station may further include a label dispenser configured to dispense a label to adhere to the medication and/or to the waste container. The deposit point of the wasting station may include a solid waste receiver and/or a liquid direct waste receiver. The wasting station may include one or more diverters to divert the medication to the particular container. The wasting station may include a user interface, wherein the user interface may provide information and/or instructions related to the authentication, the deposit point, the collection of the medication, and/or the record of the collection of the medication. The wasting station may include an analysis module, wherein the medication may be transferred to the analysis module, and wherein the analysis module may be configured to analyze the medication to determine properties of the medication.

In an inter-related aspect, a non-transitory computer-readable storage medium includes program code, which when executed by at least one data processor, causes operations including authenticating, by the at least one data processor, a user, wherein the at least one data processor is associated with a wasting station; determining, by the at least one data processor, an audit type for a medication to be deposited by the user and collected by the wasting station, wherein the audit type may be determined based on a set of predefined rules defined for the wasting station and/or the user; enabling, by the at least one data processor, access to a deposit point of the wasting station; enabling, by the at least one data processor, collection of the medication from the deposit point to a particular container of a plurality of containers, wherein the particular container may be based on the audit type; and creating, by the at least one data processor, a record of the collection of the medication.

In an inter-related aspect, an apparatus includes means for authenticating a user; means for determining an audit type for a medication to be deposited by the user and collected by a wasting station, wherein the audit type may be determined based on a set of predefined rules defined for the wasting station and/or the user; means for enabling access to a deposit point of the wasting station; means for enabling collection of the medication from the deposit point to a particular container of a plurality of containers, wherein the particular container may be based on the audit type; and means for creating a record of the collection of the medication.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4A, FIG. 4B, and FIG. 4C are diagrams depicting aspects of an example of a wasting station consistent with implementations of the current subject matter;

When practical, similar reference numbers denote similar structures, features, or elements.

DETAILED DESCRIPTION

Diversion of a medication may occur at any point in time including, for example, during the shipping, receiving, stocking, dispensing, administering, or wasting of the medication. Prescription pain medication may be especially prone to diversion due to a lack of sufficient custodial oversight, for example, during the shipping, receiving, stocking, dispensing, administering, or wasting of the prescription pain medication. For example, dispensing cabinets at medical facilities may be accessible to multiple clinicians or other personnel or users. Moreover, different users may be responsible for different aspects of dispensing, administering, and/or wasting of the medication. Thus, even when diversion is detected, it may be difficult to determine when the diversion actually occurred and to further identify the person or persons responsible for the diversion.

To provide incentives to not engage in diversion of medication, and to identify clinicians or other users who may be engaged in the diversion, a wasting system consistent with implementations of the current subject matter includes a wasting station. The wasting station includes features for securely receiving and storing wasted medication for later analysis, for example, during an audit. The wasting station may further include capabilities to analyze waste items. The wasting system may include support for witnessing the wasting process, either locally or remotely. The wasting system may provide for waste containers that may include electronic tags, biomarkers, and/or reagents that may be used to analyze waste items.

Figure 1A:
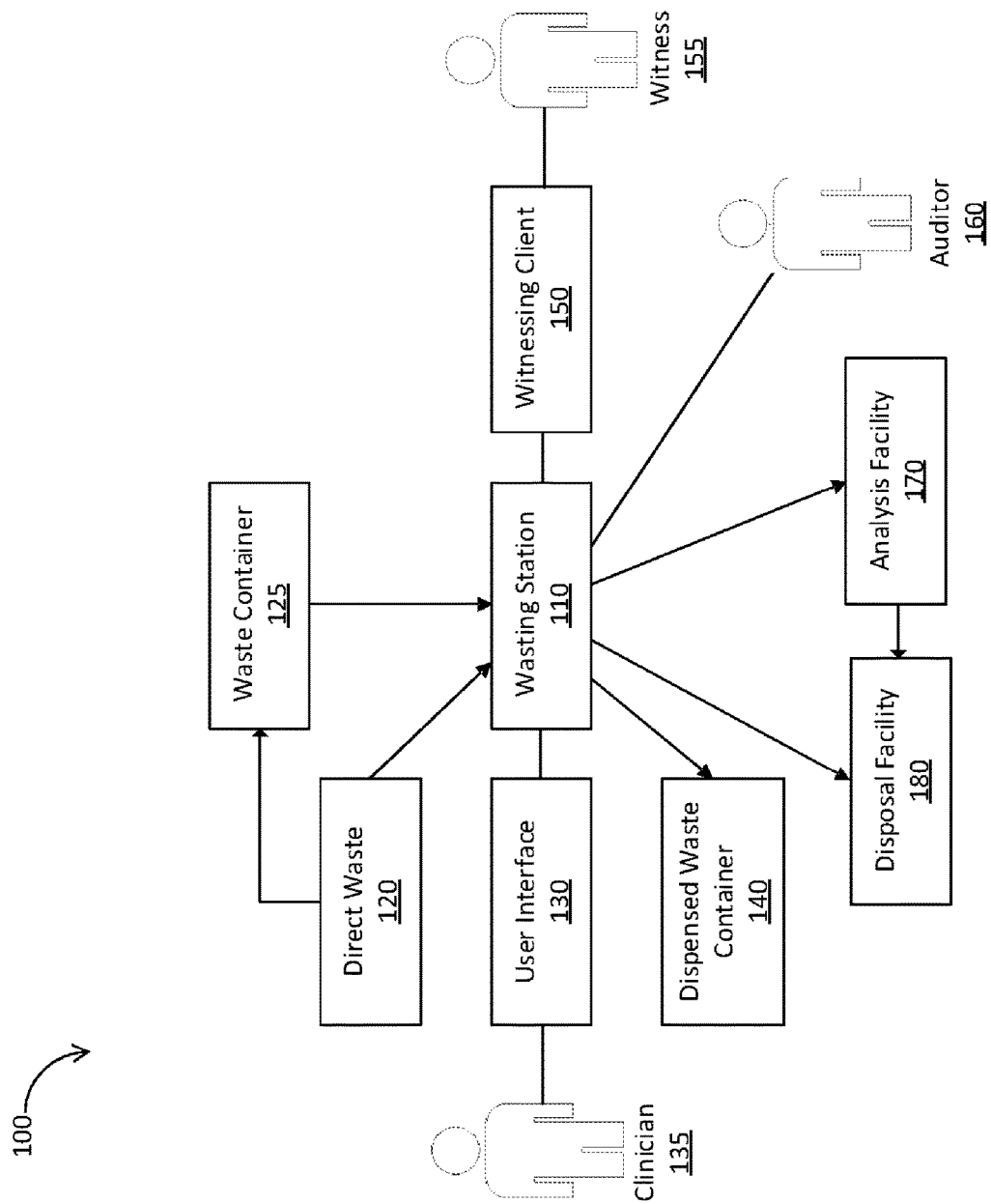
FIG. 1A and FIG. 1B are system diagrams depicting aspects of a wasting station consistent with implementations of the current subject matter.

FIG. 1A depicts a system diagram illustrating a wasting system 100 consistent with implementations of the current subject matter. Referring to FIG. 1A, the wasting system 100 includes a wasting station 110, a user interface 130 accessible to a clinician 135, and a witnessing client 150 accessible to a witness 155. The user interface 130 and the witnessing client 150 may be communicatively coupled to the wasting station 110, for example, via a network. In some implementations, the user interface 130 and/or the witnessing client 150 may be part of and/or integrated with the wasting station 110. The wasting station 110, the user interface 130, and the witnessing client 150 may be implemented as or include processor-based devices, for example, a smartphone, a tablet computer, a wearable apparatus, a desktop computer, a laptop computer, a workstation, or the like. The network may be a wired and/or wireless network including, for example, a public land mobile network (PLMN), a local area network (LAN), a virtual local area network (VLAN), a wide area network (WAN), the Internet, a short range radio connection, for example a BLUETOOTH® compatible connection, a peer-to-peer mesh network, or the like.

Consistent with implementations of the current subject matter, the witnessing client 150 allows for the witness 155 to observe a wasting process and may provide for remote observation. The witnessing client 150 may be in communication with the station 110 over one or more of: a local area network, a wireless connection, or a direct connection. The witnessing client 150 may include, for example, a laptop computer or a dedicated computer that allows a witness 155 to observe a wasting process taking place at the wasting station 110. The witnessing client 150 may be located near or at the wasting station 110. Alternatively, the witnessing client 150 may be remote, for example, at a physical location that is separate from the wasting station 110, allowing the witness 155 to observe the wasting process remotely, for example, using a camera on the wasting station 110. As such, the witnessing client 150 may reduce or eliminate the need to seek an authorized witness 155 to observe the wasting operation in real-time at the wasting station 110.

The witnessing client 150 may request credentials from the witness 155. For example, the witnessing client 150 may be prompted to enter a user name and password, scan a badge using a card reader, perform a fingerprint scan or a retina scan, and/or use facial recognition to identify the witness 155. The witnessing client 150 may transmit a control message to the wasting station 110 to collect the credential information. For example, the control message may activate a scanning device (e.g., camera, badge reader, optical scanner, etc.) associated with the wasting station 110 or cause display of a user interface to collect the credential information. The witnessing client 150 may include a display that is updated with actions performed by the clinician 135 during the wasting process. The witnessing client 150 may include the ability to communicate, view, and/or record the wasting process. Records captured at the witnessing client 150 may be stored and used during an audit of the wasting process.

Consistent with implementations of the current subject matter, the user interface 130 may be in communication with the wasting station 110 via a local area network, a wireless connection, and/or a direct connection. The user interface 130 may include, for example, a display, a touch display, a keyboard, a mouse, one or more cameras, a card reader, a barcode scanner, a retina scanner, and/or a fingerprint scanner.

The wasting system 100 may include features to ensure coordination between the witnessing client 150 and the wasting station 110. For example, when remotely witnessing an event, the witness may require certain verifications that what is being witnessed and attested to is actually what is happening. Further, from an auditing perspective, the wasting system 100 may coordinate the collection of event information (e.g., scans, credential presentation, authentication, authorization, waste container location, wasting station operational state, connectivity status (e.g., connection, disconnection, retry attempt), etc.). Accordingly, the wasting system 100 may include features to provide assurance to the users that the remote witnessing is secured and authentic along with features to capture and correlate the information collected by the separate devices (e.g., the witnessing client 150 and the wasting station 110).

The wasting system 100 may establish a secure communication channel between the witnessing client 150 and the wasting station 110. The secure communication channel may include applying a digital signature or other authentication key that verifies the integrity of the information exchanged via the session. The witnessing client 150 may detect that the secure channel is established with the wasting station 110 and provide a perceivable indication of the secure session on a display for the witnessing client 150. Similarly, the wasting station 110 may determine that a secure channel is established with the witnessing client 150 and provide a perceivable indication of the secure session on a display for the witnessing client 150. The perceivable indication may include displaying an icon, changing a color on the user interface (e.g., the frame), activating a light on the device, emitting an audible tone, or some combination of these or similar indicators. The detection of a secure session may be based on protocol messaging or information included in a message received from another device participating in the session.

The witnessing client 150 and the wasting station 110 may each present time information on respective displays. In this fashion, the users can confirm temporal synchronization of the two systems. The time information may be used to audit events during the witnessing session such as audio, video, or image data capture during the witnessing session. The time information may be encoded into the data captured during the witnessing session. For example, video data of the wasting clinician and the witness may include time stamp in the images captured. The time stamps can further enhance the security and auditing of the witnessing session.

The event information for the witnessing session may be submitted by the witnessing client 150 and the wasting station 110 using a distributed ledger or other secure logging technology such as a blockchain ledger. Once the witnessing session is established, a unique identifier may be generated by the system. The unique identifier may be used as part of records submitted to the distributed ledger along with the time information. The distributed ledger may then serve as an authoritative record of the events for the witnessing session.

A clinician 135, for example, a doctor, nurse, or other staff member or personnel (also referred herein as a user), may interact with the user interface 130 to access the functions of the wasting station 110. The user interface 130 may display prompts on the display and/or accept inputs from the clinician 135 to guide the clinician 135 through the wasting process, thereby confirming each step is complete, secure, and auditable.

The user interface 130 may authenticate the clinician 135 prior to allowing the clinician 135 to use the wasting station 110. For example, the user interface 130 may prompt the clinician 135 for a username and password or other identifying information. Alternatively or additionally, the user interface 130 may read the clinician's badge using a card reader. Alternatively or additionally, the user interface 130 may obtain biometric information from the clinician 135 including, for example, a retina scan, fingerprint scan, and/or facial recognition features.

The wasting station 110 consistent with implementations of the current subject matter is used to securely collect and store direct waste 120 and/or one or more waste containers 125 as part of a drug delivery work flow. The wasting station 110 may be configured to receive and handle the direct waste 120, which may be medication in the form of solids or liquids or medication dispensers or applicators, for example, syringes, patches, and the like. Alternatively and/or additionally, the wasting station 110 may be configured to receive and handle the one or more waste containers 125, in which medication in the form of solids or liquids or medication dispensers or applicators is contained. According to aspects of the current subject matter, the wasting station 110 may have multiple deposit points for the direct waste 120 and/or the waste containers 125. A deposit point may be formed in the housing of the wasting station 110. The deposit point may be mechanically secured to prevent insertion of unauthorized items through the deposit point. For example, at the appropriate time during an authorized witnessing session, the wasting station 110 may transmit a control message to a motor or other access control element to allow submission of a wasting container via the deposit point. The deposit point may include a scanner or other sensor (e.g., light sensor) to determine when a container has passed into the wasting station 110. The scanner or sensor may, in some implementations, be located separate from but proximate to the deposit point to achieve a similar detection. Once a submission is detected, the access control element may be activated to secure the deposit point from further submissions. Information from the sensor may be logged as an additional event during the witnessing session. The information may include duration of submission (e.g., as a proxy for length of the item submitted), duration the deposit point was unsecured, color or other optical property of the item submitted (e.g., was the wasting container of the expected color, reflectiveness, etc.), or information determined therefrom.

The user interface 130 may prompt the clinician 135 to attach an identification tag to the direct waste 120 and/or the waste container 125. The wasting station 110 may, for example, print a barcode label and prompt the clinician 135 to attach the barcode label to the direct waste 120 and/or the waste container 125. Additionally or alternatively, the wasting station 110 may dispense a radio frequency identification (RFID) tag and prompt the clinician 135 to attach the RFID tag to the direct waste 120 and/or the waste container 125. When the clinician 135 places the direct waste 120 and/or the waste container 125 in the wasting station 110, the wasting station 110 may record the tag using, for example, a barcode reader and/or an RFID tag reader. Consistent with some implementations, the wasting station 110 may affix and/or attach the barcode label and/or another label to the direct waste 120 and/or the waste container 125, for example as the item is deposited into the wasting station 110.

Consistent with implementations of the current subject matter, the wasting station 110 may dispense the waste container 125 to be used during the wasting process. The user interface 130 may prompt the clinician 135 to place and/or pour the direct waste 120 into the waste container 125 then deposit the waste container 125 into the wasting station 110. The waste container 125 for solids may include, for example, a plastic pouch, a bag, or other container. The waste container 125 for liquids may include, for example, a vial, a syringe, or other container.

The wasting station 110 may receive the direct waste 120 and dynamically package the direct waste 120 into a suitable waste container 125. Suitability may be based on a number of factors including, for example, contents of the direct waste 120, testing that will be performed on the direct waste 120, temperature or light sensitivity of the direct waste 120, physical dimensions of the direct waste 120, volume of the direct waste 120, and/or other detectable or known properties and/or characteristics of the direct waste 120.

The waste container 125 may include an identification tag, for example, a barcode label or a radio frequency identification (RFID) tag. When the clinician 135 places the waste container 125 in the wasting station 110, the wasting station 110 may record the tag using, for example, a barcode reader and/or an RFID tag reader. In some implementations, the wasting station 110 may include a printer or encoding device to apply information to the tag or generate the tag.

The waste container 125 may include one or more tamper detection features. The tamper detection feature may provide evidence as to whether the waste container 125 is tampered with before, during, and/or after the clinician 135 places the waste container 125 in the wasting station 110. For example, the waste container 125 may have a seal that is broken when the waste container 125 is opened to receive the direct waste 120. Once the direct waste 120 is deposited into the waste container 125, the clinician 135 or the wasting station 110 may apply a second seal. The second seal may include a mechanical seal affixed to the waste container 125 that will present evidence of re-opening. The second seal may include a sticker having one-time adhesive properties, such that if the sticker is removed it will not adhere to the waste container 125 again.

The waste container 125 may include a sensing device. The sensing device may detect or otherwise provide a perceivable indication of when the waste container 125 is opened and/or closed. The sensing device may maintain an event log that may be used to determine when the waste container 125 was opened and/or closed. For example, the sensing device may include a light activated pigment that will change color to indicate exposure to light and thereby indicate opening. The sensing device may include a physical tab or flange disposed on a surface of the waste container 125. Closing the waste container 125 may cause the tab or flange to move from a first position to a second position. In the second position, the substance within the waste container

125 may only be accessed by either destructive force to the entire waste container 125 or by breaking the tab or flange. The state of container and the tab or flange may be inspected to determine whether the waste container 125 was tampered with after depositing the substance. In some implementations, the sensing device may include an electrical element such as a programmable RFID tag to record information about the container. In some implementations, the waste container 125 may include a microprocessor or other programmable logic. For certain high value medications, such waste containers may be desirable to ensure tracking of the substance. The wasting station 110 may selectively identify a type of waste container 125 to be used based on the substance identified for wasting. The waste container 125 may be dynamically programmed for tracking and tamper detection specific to one or more of: the wasting user, witnessing user, wasting location, substance being wasted, or other property detectable or accessible by the wasting station 110. For example, some substances may not degrade with temperature variation. When wasting such substances, the wasting station 110 may select a wasting container that does not include temperature sensor or program the waste container 125 to disable temperature sensing features.

Consistent with implementations of the current subject matter, the waste container 125 and/or an electronic tag attached to the waste container 125 may contain biomarkers and/or reagents. The biomarkers and/or reagents may allow the wasting station 110 to identify the contents of the waste container 125 based on the results of an assay. The electronic tag may include a wireless communication capability, allowing the tag to communicate with the wasting station 110. During an assay, the wasting station 110 may send a command to cause the electronic tag to release the biomarkers and/or reagents. Based on the results of the assay, the wasting station 110 may flag the waste container 125 for further analysis and/or an audit.

The waste container 125 may include other features that allow the wasting station 110 to identify the contents of the waste container 125 and/or detect the results of an assay. For example, the waste container 125 may include windows to allow light to pass through, allowing the wasting station 110 to illuminate and/or examine the contents of the waste container 125, for example, using a camera, laser, luminescence sensor, reflectometry sensor, and/or the like.

Alternatively and/or additionally, the waste container 125 and/or an electronic tag attached to the waste container 125 may include a light emitting diode (LED). The wasting station 110 may send a signal to the electronic tag to turn the LED on or off. During an audit, for example, the wasting station 110 may send a signal to the electronic tag to turn on the LED. The illuminated LED may allow an auditor 160 to more easily identify a particular waste container 125 in a storage bin and/or container of the wasting station 110.

With continued reference to FIG. 1A, a dispensed waste container 140 is shown. Once the direct waste 120 and/or the waste container 125 are deposited into the wasting station 110, the direct waste 120 and/or the waste container 125 may be directed to one of a plurality of bins or containers for holding the direct waste 120 and/or the waste container 125. The dispensed waste container 140 may be the bin or the container, or a group of bins or containers, into which the direct waste 120 and/or the waste container 125 are deposited. The dispensed waste container 140 may be removable from the wasting station 110 by an authorized clinician or other personnel. The removal of the dispensed waste container 140 may be subject to authentication by the wasting station 110, where the authentication is a verification that the clinician (e.g., the clinician 135) or other personnel (e.g., the auditor 160) are authorized to handle the dispensed waste container 140. Such authentication may include, for example, prompting by the user interface 130 for the clinician 135 or the auditor 160 to enter a username and password or other identifying information. Alternatively or additionally, the user interface 130 may read the clinician's or the auditor's badge using a card reader. Alternatively or additionally, the user interface 130 may obtain biometric information from the clinician 135 or the auditor 160 including, for example, a retina scan, fingerprint scan, and/or facial recognition features.

As shown in FIG. 1A, both an analysis facility 170 and a disposal facility 180 may be provided as part of the wasting system 100. Once the direct waste 120 and/or the waste container 125 are deposited in the wasting station 110, the direct waste 120 and/or the waste container 125 may be stored in a waste storage bin. The waste storage bin may include an asset tracking feature, such as an RFID tag, a Bluetooth Low Energy beacon, a short range radio, a barcode, and/or the like. The waste storage bin, the direct waste 120 and/or the waste container 125, may subsequently be transferred to one or more of the analysis facility 170 and/or the disposal facility 180. Such transfer may be performed by the auditor 160, for example, after authentication of the auditor 160, or other authenticated user. The transfer of the waste storage bin, the direct waste 120 and/or the waste container 125 from the wasting station 110 may be tracked and recorded by the wasting station 110 as part of a record detailing the wasting process of the direct waste 120 and/or the wasting container 125. In particular, consistent with implementations of the current subject matter, the wasting station 110 may collect and store information about the wasting process. The stored information may be used during an audit to ensure compliance with rules and regulations governing the safe disposal of medications. The wasting process may include establishing a chain of custody for the direct waste 120 and/or the waste container 125.

Figure 1B:
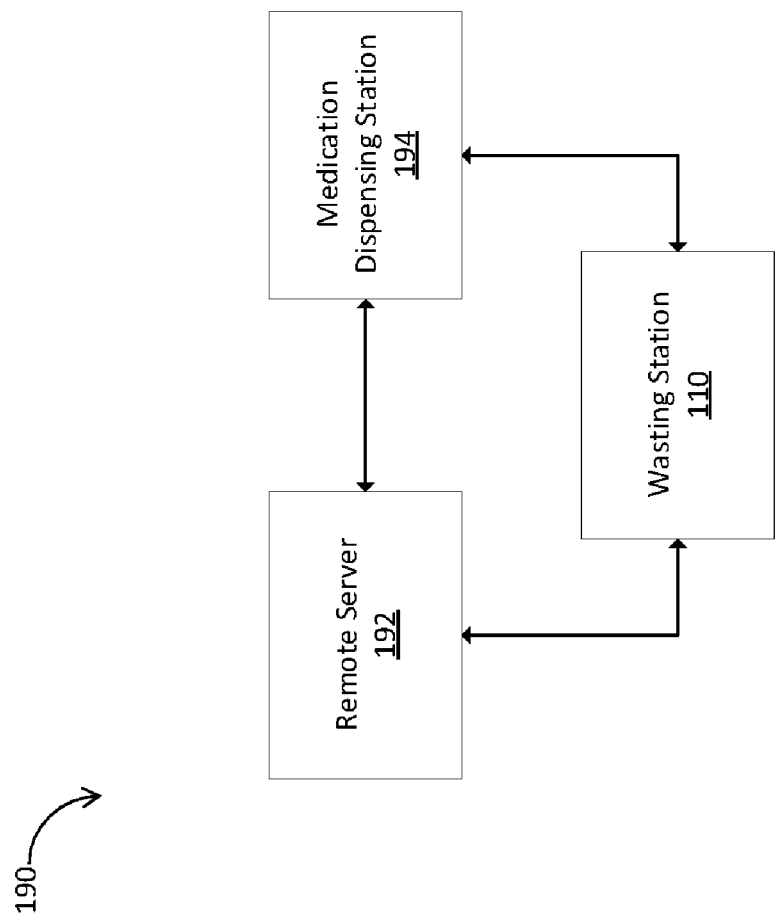

Referring to FIG. 1B, the wasting station 110 may be part of a system 190 that includes a remote server 192 and a medication dispensing station 194. The wasting station 110 and the medication dispensing station 194 may be an integrated unit or more be separate stations remote from one another. The wasting station 110, the remote server 192, and the medication dispensing unit 194 may be communicatively coupled to one another via a network. The network may be a wired and/or wireless network including, for example, a public land mobile network (PLMN), a local area network (LAN), a virtual local area network (VLAN), a wide area network (WAN), the Internet, a short range radio connection, for example Bluetooth, a peer-to-peer mesh network, and/or the like. The remote server 192 may provide data and/or instructions to the wasting station 110 to implement one or more features of the wasting process consistent with implementations of the current subject matter. For example, the remote server 192 may coordinate the communication session between the wasting station 110 and a witnessing client.

Figure 2:
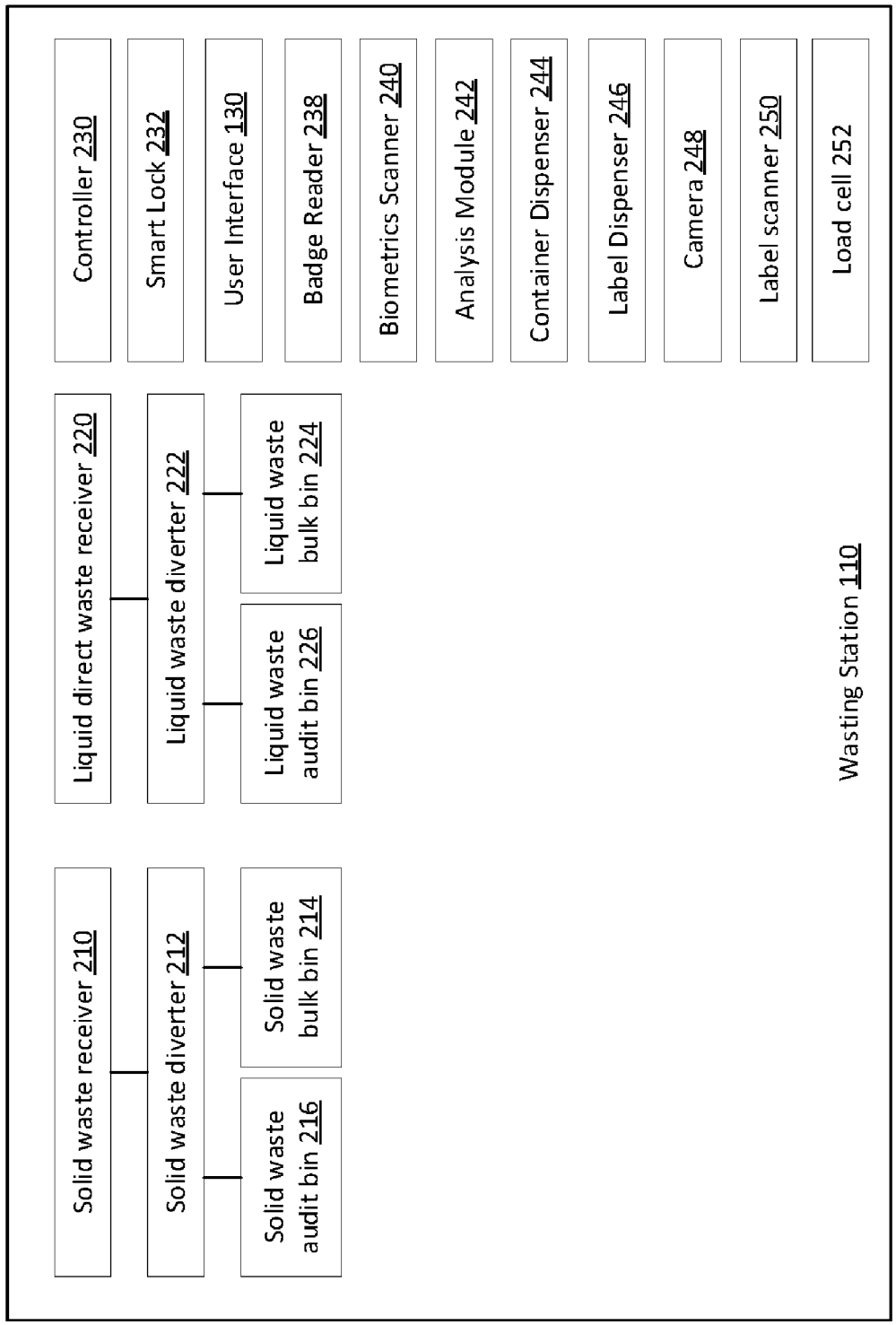
FIG. 2 is a block diagram depicting aspects of a wasting station consistent with implementations of the current subject matter.

FIG. 2 is a block diagram depicting aspects of the wasting station 110 consistent with implementations of the current subject matter. The wasting station 110 may include a controller 230 which controls the functions of the wasting station 110. The controller 230 may include, for example one or more processors, one or more computers, one or more programmable logic controllers, and/or the like. The controller 230 may include actuators, for example, motors, solenoids, and/or the like. The controller 230 may use the actuators to move mechanisms into a desired position. The controller 230 may include sensors, for example, limit switches, optical sensors, tachometers, encoders, load cells, torque sensors, and/or the like. The controller 230 may use the sensors to detect whether a mechanism is, for example, in position, out of position, moving, applying a force, applying a torque, and/or the like.

The wasting station 110 may include separate collection paths for collecting solid waste items and liquid waste items. The solid waste collection path may include a solid waste receiver 210, a solid waste diverter 212, a solid waste bulk bin 214, and a solid waste audit bin 216. Similarly, the liquid collection path may include a liquid direct waste receiver 220, a liquid waste diverter 222, a liquid waste bulk bin 224, and a liquid waste audit bin 226. The solid waste receiver 210 and the liquid direct waste receiver 220 may each include one-way paths for depositing waste items (e.g., the direct waste 120 and/or the waste container 125) into the wasting station 110. A diverter, such as the solid waste diverter 212 and/or the liquid waste diverter 222 may include mechanisms that allow the direct waste 120 and/or the waste container 125 to travel from the deposit point to a waste storage bin. The diverter may include mechanical structures, including tubing, valves, channels, hatches, covers, hinges, slides, and/or the like. The diverter may include actuators that can move the mechanical structures from one position to another. The diverter may include sensors that can detect the presence of the direct waste 120 and/or the waste container 125 as the waste item moves through the diverter. The diverter may include sensors that can detect the position of and/or the motion of the mechanical structures included in the diverter. The sensors included in the diverter may include photocells, strain gauges, proximity switches, linear encoders, rotary encoders, temperature sensors, optical sensors, cameras, microphones, barcode readers, fluid level detectors, and/or the like.

Prior to collecting a solid waste item, for example, the direct waste item 120 and/or the waste container 125, the controller 230 may move the solid waste diverter 212 into either a solid bulk position or a solid audit position. The position of the solid waste diverter 212 may be determined based on one or more of: the wasting user, witnessing user, wasting location, substance being wasted, or other property detectable or accessible by the wasting station 110. For example, if the substance being wasted is an uncontrolled solid (e.g., excess ibuprofen), the risk of diversion may be less than when wasting a controlled substance such as oxycodone. In some implementations, a risk score may be generated based on one or more of: the wasting user, witnessing user, wasting location, substance being wasted, or other property detectable or accessible by the wasting station 110. If the risk score corresponds to a threshold, the substance being wasted may be directed to the audit bin by adjusting a position of the solid waste diverter 212. Features for generating risk scores are described in, for example, U.S. Patent Publication No. US20170109497A1 entitled "Controlled substance diversion detection systems and methods," commonly owned and assigned, which is incorporated by reference in its entirety. When the solid waste diverter 212 is in the solid bulk position, the solid waste item may move through the solid waste receiver 210, through the solid waste diverter 212, and into the solid waste bulk bin 214. When the solid waste diverter 212 is in the solid audit position, the solid waste item may move through the solid waste receiver 210, through the solid waste diverter 212, and into the solid waste audit bin 216.

Similarly, prior to collecting a liquid waste item, the controller 230 may position the liquid waste diverter 222 to either a liquid bulk position or a liquid audit position. The position of the liquid waste diverter 222 may be determined based on one or more of: the wasting user, witnessing user, wasting location, substance being wasted, or other property detectable or accessible by the wasting station 110. For example, if the substance being wasted is an uncontrolled liquid (e.g., excess acetaminophen), the risk of diversion may be less than when wasting a controlled substance such as fentanyl. In some implementations, a risk score may be generated based on one or more of: the wasting user, witnessing user, wasting location, substance being wasted, or other property detectable or accessible by the wasting station 110. If the risk score corresponds to a threshold, the substance being wasted may be directed to the audit bin by adjusting a position of the liquid waste diverter 222. Features for generating risk scores are described in, for example, U.S. Patent Publication No. US20170109497A1 entitled "Controlled substance diversion detection systems and methods," commonly owned and assigned, which is incorporated by reference in its entirety.

When the liquid waste diverter 222 is in the liquid bulk position, a liquid waste item poured into the liquid direct waste receiver 220 will move through the liquid waste diverter 222 and into the liquid waste bulk bin 224. When the liquid waste diverter 222 is in the liquid audit position, the liquid waste item poured into the liquid direct waste receiver 220 may move through the liquid waste diverter 222 and into the liquid waste audit bin 226.

Consistent with implementations of the current subject matter, the wasting station 110 may include other collection paths for other types of waste items. For example, the wasting station 110 may include a patch collection path, which may include a patch collection slot, a patch diverter, a patch bulk bin, and a patch audit bin. Prior to collecting a patch waste item, for example, the direct waste 120, the controller 230 may position the patch diverter to either a patch bulk position or a patch audit position. When the diverter is in the patch bulk position, the patch waste item will travel through the patch diverter and into the patch bulk bin. When the patch diverter is in the patch audit position, the patch waste item will travel through the patch diverter and into the patch audit bin. As discussed with reference to the solid and liquid diverters, the position of the patch diverter or any other diverter included in the wasting station 110 may be dynamically adjusted based on one or more of: the wasting user, witnessing user, wasting location, substance being wasted, or other property detectable or accessible by the wasting station 110.

Consistent with implementations of the current subject matter, the clinician 135 may not know whether a diverter (for example, the solid waste diverter 212 or the liquid waste diverter 222), is moved to the bulk position or the audit position. As a result, the clinician 135 may not know whether the waste item 120 is being collected for audit, providing an incentive for the clinician 135 to not engage in diversion of medications.

Consistent with implementations of the current subject matter, the wasting station 110 may include a removable cartridge. The removable cartridge may hold audit bins used to collect liquid and/or solid waste items. For example, when a solid waste item is deposited into the solid waste audit bin 216, the direct waste 120 may drop into an audit bin on the removable cartridge. During an audit, the auditor 160 may remove the cartridge for further analysis and replace the cartridge with a fresh and/or empty cartridge. Like the wasting containers, the cartridge may include tamper detection and environment sensors. Examples of the cartridge include a tote, a bin, a pouch, a drawer, or other vessel to hold waste containers including substances for audit. The cartridge may be selectively secured within or to the housing of the wasting station 110 such that only authorized users can remove the cartridge from the wasting station 110. For example, a motorized latch may be mounted on a surface of the wasting station 110. The motorized latch may connect to a surface of the cartridge such that in a first position the cartridge is secured to the wasting station 110. Upon receipt of credentials of an authorized auditing user, the wasting station 110 may transmit a command to move the motorized latch to a second position. In the second position, the cartridge may be detached from the wasting station 110. Adjustments to the cartridge motorized latch may be logged by the wasting station 110 to further enhance the traceability of the wasting process.

With continued reference to FIG. 2, the wasting station 110 may include a container dispenser 244, which may dispense the waste container 125 used for collecting one or more waste items. The container dispenser 244 may dispense, for example, liquid waste containers, solid waste containers, and/or waste containers for other types of waste items.

The wasting station 110 may also include a label dispenser 246, which may dispense one or more labels for adhering to the direct waste 120 and/or the waste container 125. The one or more labels may be used to track and/or audit the direct waste 120 and/or the waste container 125 during the wasting process consistent with implementations of the current subject matter.

The wasting station 110 may include one or more cameras, for example, camera 248 as shown in FIG. 2. The camera 248 may be used to monitor and/or record the wasting process, including recording video of the person who places a waste item in the wasting station 110. One or more cameras 248 may be used to record video of the waste item as it is placed in a collection receiver or deposit point, for example, the solid waste receiver 210. One or more cameras 248 may be used for image analysis of a solid waste item. Image analysis of a solid waste item may include identification of medications based on, for example, color, size, shape, and/or markings.

The wasting station 110 may include one or more load cells, including the load cell 252. The controller 230 may use the load cell 252 to measure a force or torque applied to an element of the wasting station 110. The load cell 252 may be in mechanical contact with one of the waste storage bins, including the solid waste bulk bin 214, solid waste audit bin 216, the liquid waste bulk bin 224, the liquid waste audit bin 226, and/or the like. The controller 230 may obtain measurements from the load cell 252. The measurement may indicate a mass of the waste storage bin, which may include the mass of any contents of the waste storage bin.

Consistent with implementations of the current subject matter, the wasting station 110 may include moveable covers and/or shutters to provide access to and/or to prevent access to one or more deposit points of the wasting station 110. The controller 230 may control a position of the covers and/or shutters. The controller 230 may open a cover and/or shutter to allow the direct waste 120 and/or the waste container 125 to be placed in or poured into a waste receiver. After the direct waste 120 and/or the waste container 125 are deposited, the controller 230 may close the cover and/or shutter to prevent other items from being deposited and/or to prevent unauthorized removal of waste items from the wasting station 110.

Consistent with implementations of the current subject matter, the wasting station 110 may include one or more auditing features. The one or more auditing features may be features that allow for the direct waste 120 and/or the waste container 125 to be tracked and associated with a user, for example, the clinician 135. For example, the wasting station 110 may record information collected when the direct waste 120 is deposited, including the identification tag (barcode, RFID tag, etc.), the identity of the clinician 135 who deposited the direct waste 120, videos recorded during the wasting process, and physical property measurements taken during the wasting process. For example, the wasting station 110 may include a badge reader 238 for reading an identification code of the clinician 135 and/or a biometric scanner 240 for obtaining biometric features of the clinician 135. The wasting station 110 may include a label scanner 250 to scan the label of the direct waste 120 and/or the waste container 125. The scanned label may be used as part of the record created of the wasting process and may be linked to or associated with the clinician 135 for tracking and auditing purposes. The record of the wasting process may also include time and date details to associate timing with the wasting process.

Consistent with implementations of the current subject matter and as shown in FIG. 2, the wasting station 110 may include an analysis module 242 capable of analyzing the waste item (e.g., the direct waste 120 and/or the waste item placed in the waste container 125). Prior to analysis, the controller 230 may transfer the waste item from an audit container to the analysis module 242. In some implementations, the analysis module may be separate and remote from the wasting station 110 (e.g., the analysis facility 170 as shown in FIG. 1A). The audit container may contain one or more cartridges that may be transferred from the audit container to the analysis module 242 under control of the controller 230. For example, the controller 230 may transfer a cartridge containing a liquid waste item from the liquid waste audit bin 226 to the analysis module 242. The analysis module 242 may perform analysis of liquid waste items. For example, the analysis module 242 may perform, on a liquid waste item, Raman spectroscopy, refractometry, and/or the like. The analysis module 242 may perform analysis of solid waste items. For example, the analysis module 242 may perform image analysis of the solid waste item. Image analysis may include, for example, identification of medications based on, color, size, shape, markings, and/or the like.

Consistent with implementations of the current subject matter, the wasting station 110 may include sensors capable of measuring physical properties of the direct waste 120 and/or the waste container 125 as it is being deposited, stored, and/or analyzed. For example, the audit bins 216, 226 of the wasting station 110 may include flow rate sensors, color sensors, density sensors, scales, temperature sensors, and/or other physical sensors.

The wasting station 110 may be secured and/or locked using a smart lock 232. The smart lock 232 may be configured to release or engage based on multiple factors that are dynamically assessed. For example, the smart lock 232 may be applied to a bulk bin or audit bin of the wasting station 110. The smart lock 232 may include location awareness to determine a current location of the smart lock 232. The smart lock 232 may consider the location along with the credentials of a user when the user requests access to the locked element. The smart lock 232 may determine, based on the location and user credentials, whether to release the smart lock 232. This ensures that only authorized personnel are allowed to access the locked element, and that such access only takes place in an appropriate location. The appropriate location may include, for example, a testing room or other facility with monitoring that can be used to ensure the security of the bulk and/or audit bins, and that the bulk and/or audit bins and waste items stored therein are not tampered with and/or diverted. The smart lock 232 may include additional and/or other sensors. For example, the smart lock 232 may include a temperature sensor to record the environment around the locked element. This temperature information may affect the results of tests performed on waste items stored in the locked element. The smart lock 232 may include a memory element to store the sensor, location, time, and/or other information detected or generated by the smart lock 232. The smart lock 232 may include a communications module for transmitting sensor data along with access requests.

Consistent with implementations of the current subject matter, the wasting station 110 may be a standalone unit (e.g., a kiosk or a mobile cart). Alternatively, the wasting station 110 may be wall mounted. Alternatively, the wasting station 110 may be mounted to and/or attached to another device, such as the medication dispensing station 194.

Consistent with implementations of the current subject matter, if the clinician 135 is suspected of diverting medications, the wasting station 110 may flag for an audit the direct waste 120 and/or the waste container 125.

Figure 3:
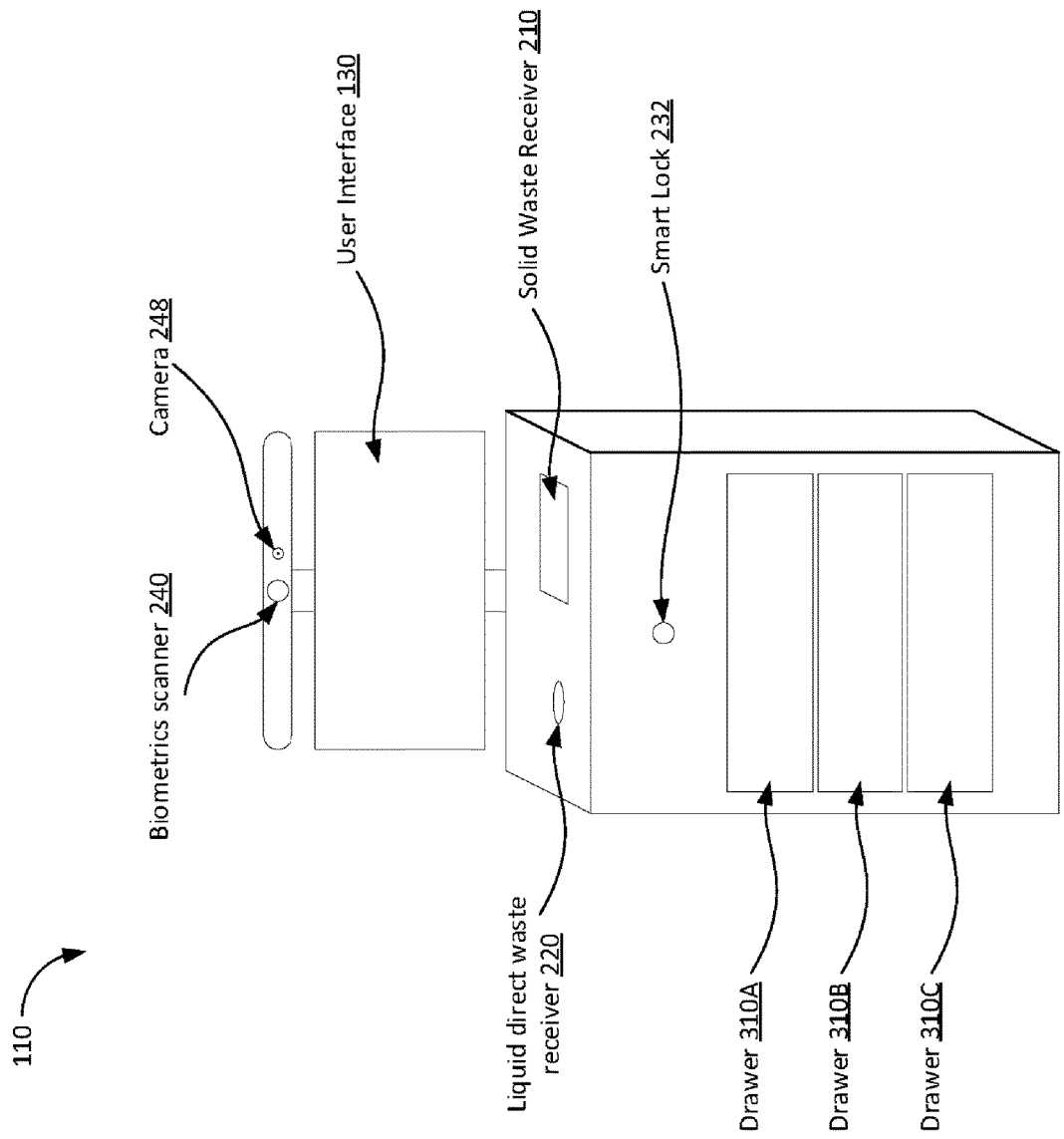
FIG. 3 is a diagram depicting an example of a wasting station consistent with implementations of the current subject matter.

FIG. 3 is a diagram depicting an example of a wasting station 110 consistent with implementations of the current subject matter. The size, shape, and form of the wasting station 110 shown in FIG. 3 is an example, so other sizes, shapes, and forms may be implemented as well.

Shown in FIG. 3 is the user interface 130, which may guide the clinician 135 through the wasting process, including, for example, authenticating the user, labeling and/or securing the waste item, and/or depositing the direct waste 120 and/or the waste container 125 into a deposit point (e.g., the liquid direct waste receiver 220 or the solid waste receiver 210) of the wasting station 110. Also shown in the representation of the wasting station 110 of FIG. 3 are the biometrics scanner 240, the camera 248, and the smart lock 232. The user interface 130 may display prompts on the display and/or accept inputs from the clinician 135 to guide the clinician 135 through the wasting process, thereby confirming each step is complete, secure, and auditable. The user interface 130 may provide visual feedback based on images captured by the camera 248. The visual feedback may allow the clinician 135 to verify that the wasting station 110 has a clear image of the substance being wasted.

The wasting station 110 may include one or more drawers, such as drawer 310A, drawer 310B, and drawer 310C. The drawers 310A and 310B may include the audit bins, for example, the solid waste audit bin 216 and the liquid waste audit bin 226. The drawers 310A and 310B may each include passages to bulk bins, for example, the solid waste bulk bin 214 and the liquid waste bulk bin 224. The drawer 310C may include the bulk bins for bulk disposal. This arrangement, as shown in FIG. 3, allows for the collection of solid waste and liquid waste in the drawers 310A and 310B for auditing of the solid waste and liquid waste. Moreover, the drawer arrangement as shown in FIG. 3 allows for the waste not selected for audit to be collected in the bulk bins in the drawer 310C.

FIG. 4A, FIG. 4B, and FIG. 4C are diagrams depicting aspects of the drawers 310A, 310B, and 310C, respectively, of the wasting station 110 shown in FIG. 3, consistent with implementations of the current subject matter. As shown in FIG. 4A, the drawer 310A includes the liquid waste audit bin 226 for collecting liquid waste for auditing. The drawer 310A also includes a pass through 410 for diverting liquid waste. As shown in FIG. 4B, the drawer 310B includes the solid waste audit bin 216 for collecting solid waste for auditing. The drawer 310B also includes a pass through 420 for diverting solid waste. The drawer 310C, as shown in FIG. 4C, includes the liquid waste bulk bin 224 and the solid waste bulk bin 214. Liquid waste diverted through the pass through 410 may be diverted for collection in the liquid waste bulk bin 224, while solid waste diverted through the pass through 420 may be diverted for collection in the solid waste bulk bin 214.

Figure 4D:
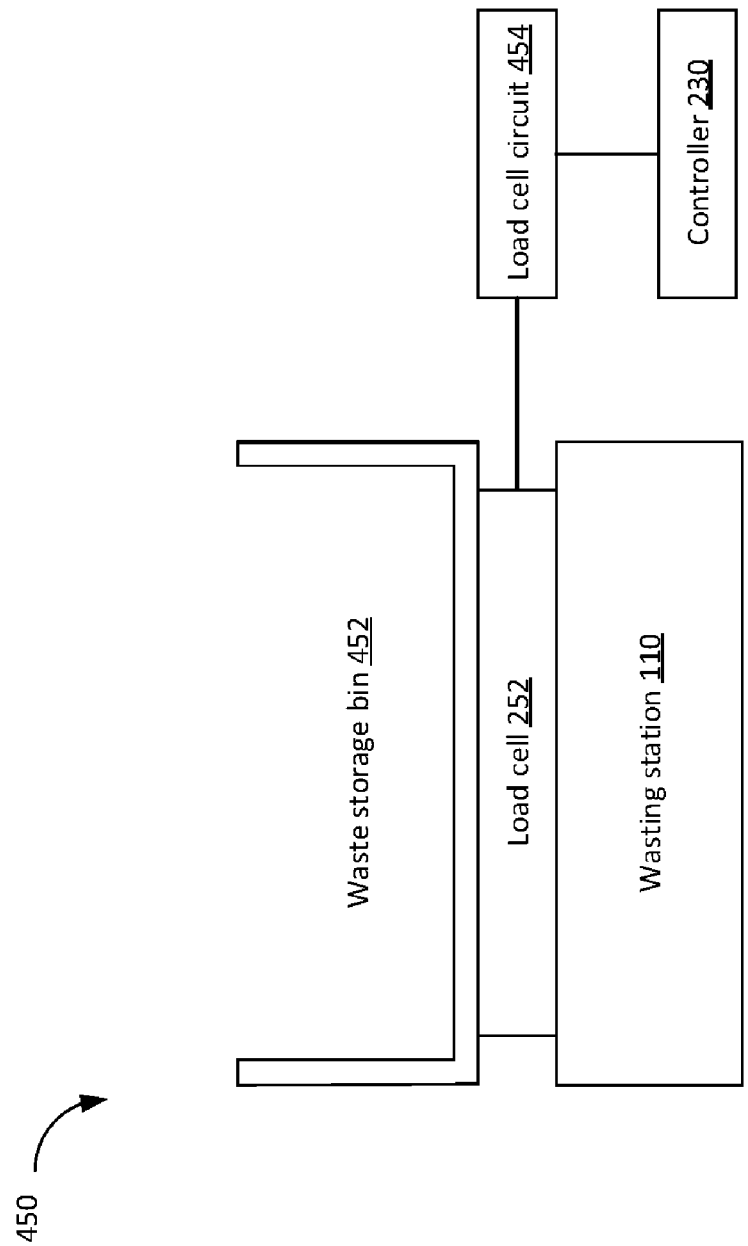
FIG. 4D is a block diagram depicting aspects of an example of a wasting station consistent with implementations of the current subject matter.

FIG. 4D is a block diagram depicting aspects of an example of a wasting station 110 consistent with implementations of the current subject matter. The wasting station 110 may include a load cell 252. The load cell 252 may be in direct mechanical contact with a stationary part of the wasting station 110 and a waste storage bin 452. The waste storage bin 452 may include the solid waste bulk bin 214, the solid waste audit bin 216, the liquid waste bulk bin 224, the liquid waste audit bin 226, and/or the like. When a force and/or torque is applied to the waste storage bin 452, such as when waste material is placed in the waste storage bin 452, the force and/or torque is delivered to the load cell 252, such that the load cell 252 is strained and the electrical resistance of the load cell 252 changes. The load cell 252 may be electrically connected to load cell circuit 454. The load cell circuit 454 may include a voltage source, an analog-to-digital converter, and/or a temperature sensor. The controller 230 may use temperature readings from the temperature sensor to apply temperature compensation to load cell measurements. The load cell circuit 454 may include one or more reference voltage sources. The controller 230 may use the reference voltages to calibrate values produced by the analog-to-digital converter. The load cell circuit 454 may be electrically connected to the controller 230, such as through a data bus, an input/output bus, and/or the like. Alternatively and/or additionally, the load cell 252 and the load cell circuit 454 may be part of a smart sensor. The smart sensor, including the load cell 252 and the load cell circuit 454, may send load cell measurements to the controller 230 via a wired or wireless connection. A wired connection between the controller 230 and the smart sensor may be based on a standard such as Recommended Standard 232 (RS-232), RS-485, Universal Serial Bus (USB), Institute for Electrical and Electronics Engineers (IEEE) 802.1, and/or the like. A wireless connection between the controller 230 and the smart sensor may be based on a wireless standard, such as BLE, IEEE 802.11, IEEE 802.15.4, and/or the like.

Figure 5B:
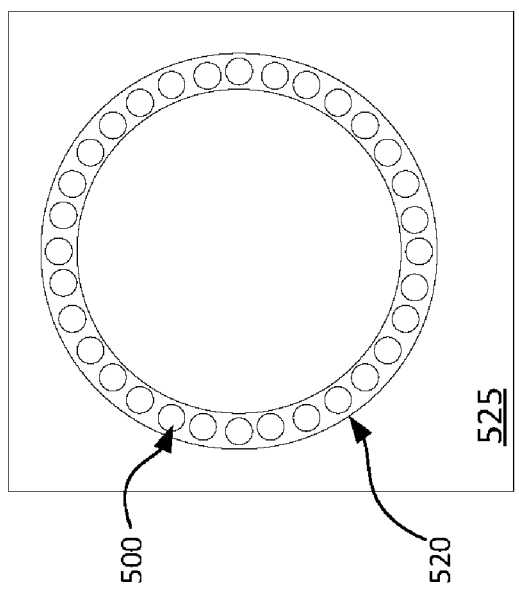
FIG. 5B, FIG. 6A, and FIG. 6B are diagrams depicting examples of waste collection aspects consistent with implementations of the current subject matter.
Figure 5A:
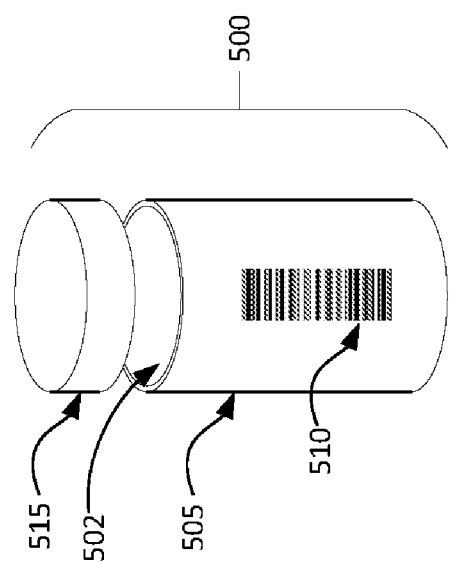
FIG. 5A is a diagram depicting aspects of an example of a waste collection apparatus consistent with implementations of the current subject matter.

FIG. 5A depicts an audit bin 500 that may be used with the wasting station 110. The audit bin 500 has a body 502 to which a label 505 with an identification tag 510 may be adhered. A lid 515 may removably couple to the body 502 to secure the contents contained within the body 502. The lid 515 may be coupled to the body 502 by a mechanism in the wasting station 110 or manually by a user, for example, the auditor 160, after the body 502 is filled with liquid or solid waste items.

FIG. 5B depicts a removable cartridge 525 that may be contained within the wasting station 110 and on which a plurality of the audit bins 500 may be held for collecting liquid and/or solid waste items that are passed through the solid waste receiver 210 and/or the liquid direct waste receiver 220. A rotating plate 520 may be provided on the removable cartridge 525, and the plurality of audit bins 500 may be arranged on the rotating plate 520. The rotating plate 520 may index such that an empty audit bin 500 is positioned beneath the solid waste receiver 210 or the liquid direct waste receiver 220. When solid waste or liquid waste is deposited into the wasting station 110, the solid waste or liquid waste may be directed to the empty audit bin 500. When the audit bin 500 is filled, the controller 230 may index the rotating plate 520 such the filled audit bin 500 is moved away from the line of the solid waste receiver 210 or the liquid direct waste receiver 220, and an empty audit bin 500 is now positioned to receive the solid waste or liquid waste therein. The label scanner 250 of the wasting station 110 may scan the identification tag 510 to track and audit the wasting process.

Implementations of the current subject matter are not limited to the audit bin 500 and the removable cartridge 525 depicted in FIG. 5A and FIG. 5B. The audit bins consistent with implementations of the current subject matter may be of a variety of sizes, shapes, and forms to accommodate a variety of medication waste. The removable cartridge consistent with implementations of the current subject matter may also be of a variety of sizes, shapes, and forms to accommodate various types of audit bins.

Figure 6B:
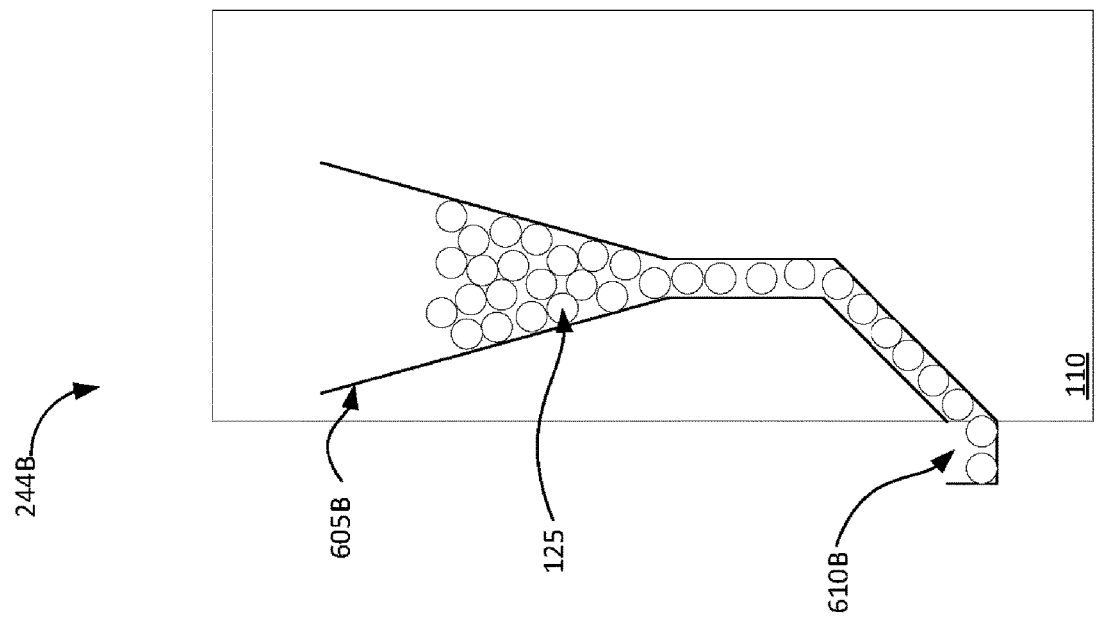
Figure 6A:
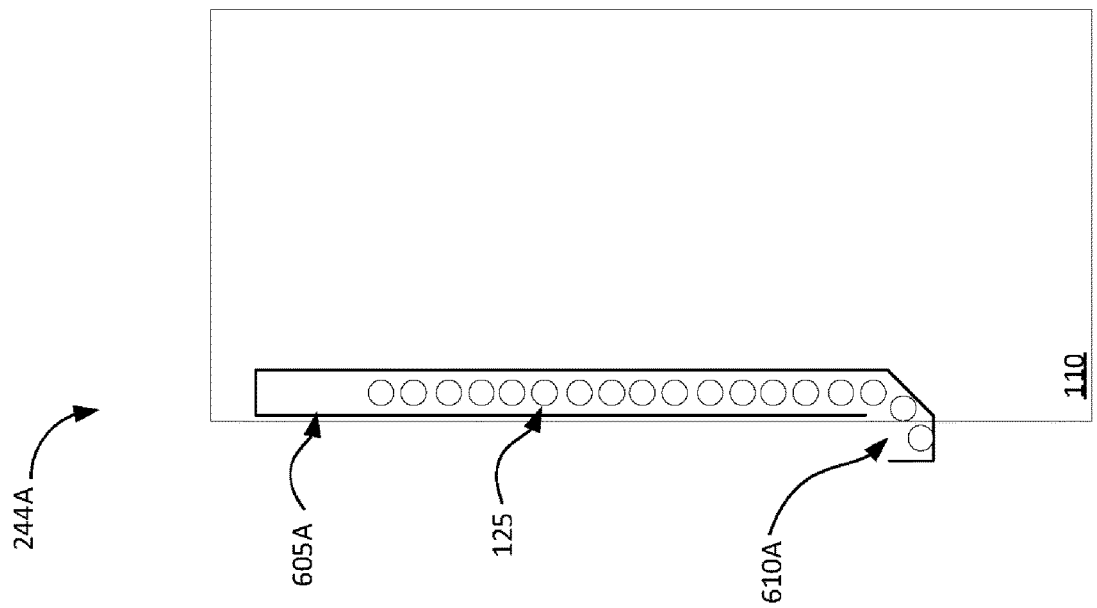

FIG. 6A and FIG. 6B depict examples of container dispensers 244A and 244B, respectively, for dispensing waste containers 125 to the clinician 135 or other authorized personnel. As shown in FIG. 6A, a chute 605A is provided for holding waste containers 125 in the wasting station 110. An opening 610A is provided in the wasting station 110, allowing the clinician 135 to access the waste container 125 through the opening 610A and causing the other waste containers 125 to move down the chute 610A toward the opening 610A. As shown in FIG. 6B, a funnel 605B is provided for containing and directing the waste containers 125 toward an opening 610B formed in the wasting station 110, allowing the clinician 135 to access the waster container 125 through the opening 610B.

Implementations of the current subject matter are not limited to the examples shown for the container dispensers 244A and 244B shown in FIG. 6A and FIG. 6B. The container dispensers 244 may be of a variety of sizes, shapes, and forms to accommodate various waste containers 125. For example, consistent with implementations of the current subject matter, the openings 610A and 610B may include an access door, the opening and closing of which is controlled by the controller 230 upon, for example, authentication of the clinician 135 or receipt of a control message from the witnessing client 150.

Figure 7B:
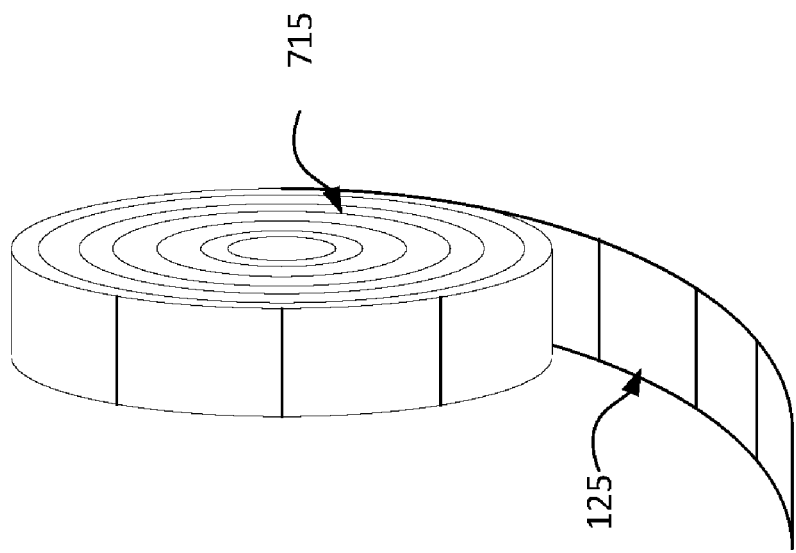
FIG. 7A and FIG. 7B are diagrams depicting aspects of examples of waste collection apparatuses consistent with implementations of the current subject matter.
Figure 7A:
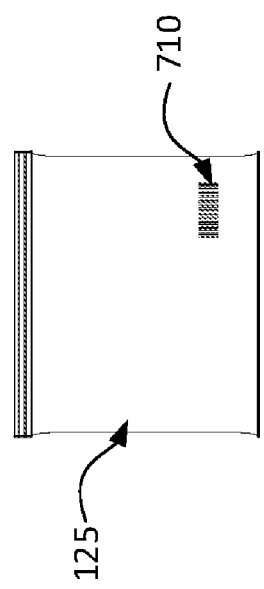

FIG. 7A depicts an example of a waste container 125 that is in the form of a bag for holding waste items consistent with implementations of the current subject matter. The waste container 125 may include a container identification tag 710 for tracking and auditing the waste item contained in the waste container 125. FIG. 7B depicts a plurality of the waste containers 125 arranged in a rolled form or roll 715 in which the clinician 135 is able to access the waste container 125 at the end of the roll 715. For example, the waste containers 125 may be connected to one another in the roll 715. By pulling or applying a force to the waste container 125 at the end of the roll 715, the clinician 135 may be able to separate the waste container 125 at the end of the roll 715 from the remainder of the roll 715. In some implementations, the wasting station 110 may include a motor or other electromechanical components to advance the roll 715 in response to a control message. The roll may be positioned near a printing device such that the waste container 125 can be printed on before the waste container 125 is presented to a user.

The roll 715 may not include partitioned containers, but rather include a continuous sleeve of material that can be portioned based on the item to be wasted. For example, if a syringe is going to be wasted, the roll 715 may dispense a rectangular pouch waste container to receive an elongated syringe. Similarly, if three pills are to be wasted, the roll 715 may dispense a smaller pouch waste container that would be needed for the syringe to receive the pills. The wasting station 110 may include a portioning device to allocate a portion of the roll 715. The portioning device may include a cutting surface for separating the portion from the roll 715. In some implementations, a sealing element may be included such that one opening is available for the waste container to receive the waste substance. The sealing element may be a heating element to melt the seal. The sealing element may be a polymer dispenser configured to deposit a quantity of sealant on the waste container. The sealing element may be a pressure based element to apply sufficient pressure to the portion of the roll 715 to create a fused seal for the waste container 125.

Figure 8B:
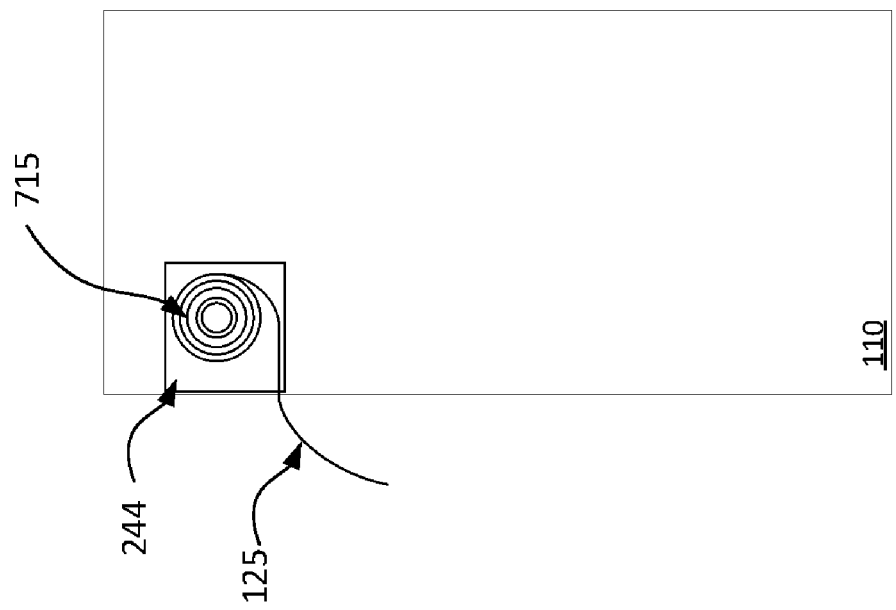
FIG. 8A and FIG. 8B are diagrams depicting aspects of examples of a wasting station consistent with implementations of the current subject matter.
Figure 8A:
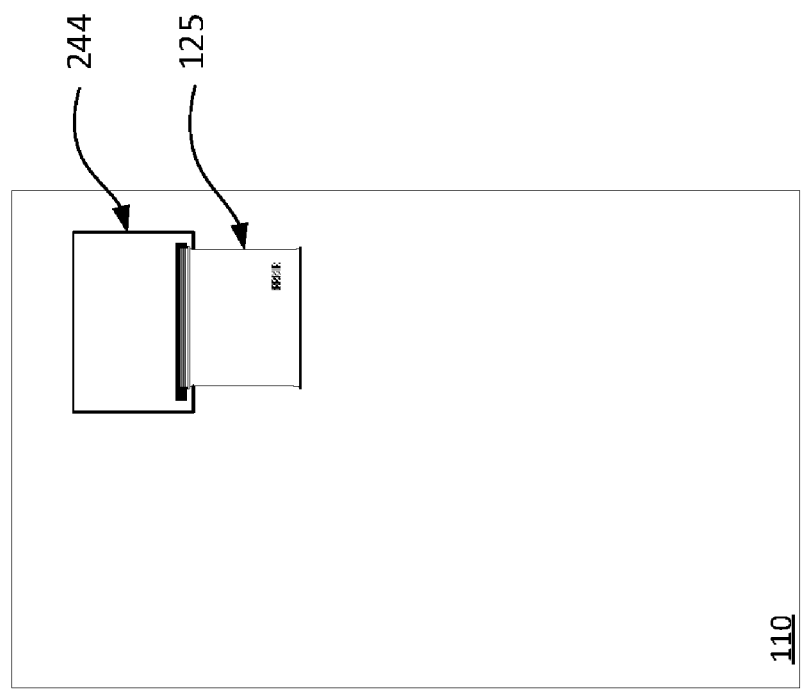

FIG. 8A and FIG. 8B depict dispensing the waste container 125 shown in FIG. 7A and FIG. 7B from the container dispenser 244 of the wasting station 110, consistent with implementations of the current subject matter. FIG. 8A is a front view of the wasting station 110, and FIG. 8B is a cross-sectional side view of the wasting station 110. The arrangement of the waste containers 125, the roll 715, and the container dispenser 244 portrayed in FIG. 7A FIG. 8B are non-limiting examples. The waste containers 125 and the container dispenser 244 consistent with implementations of the current subject matter may take a variety of other sizes, shapes, and forms.

Figure 9:
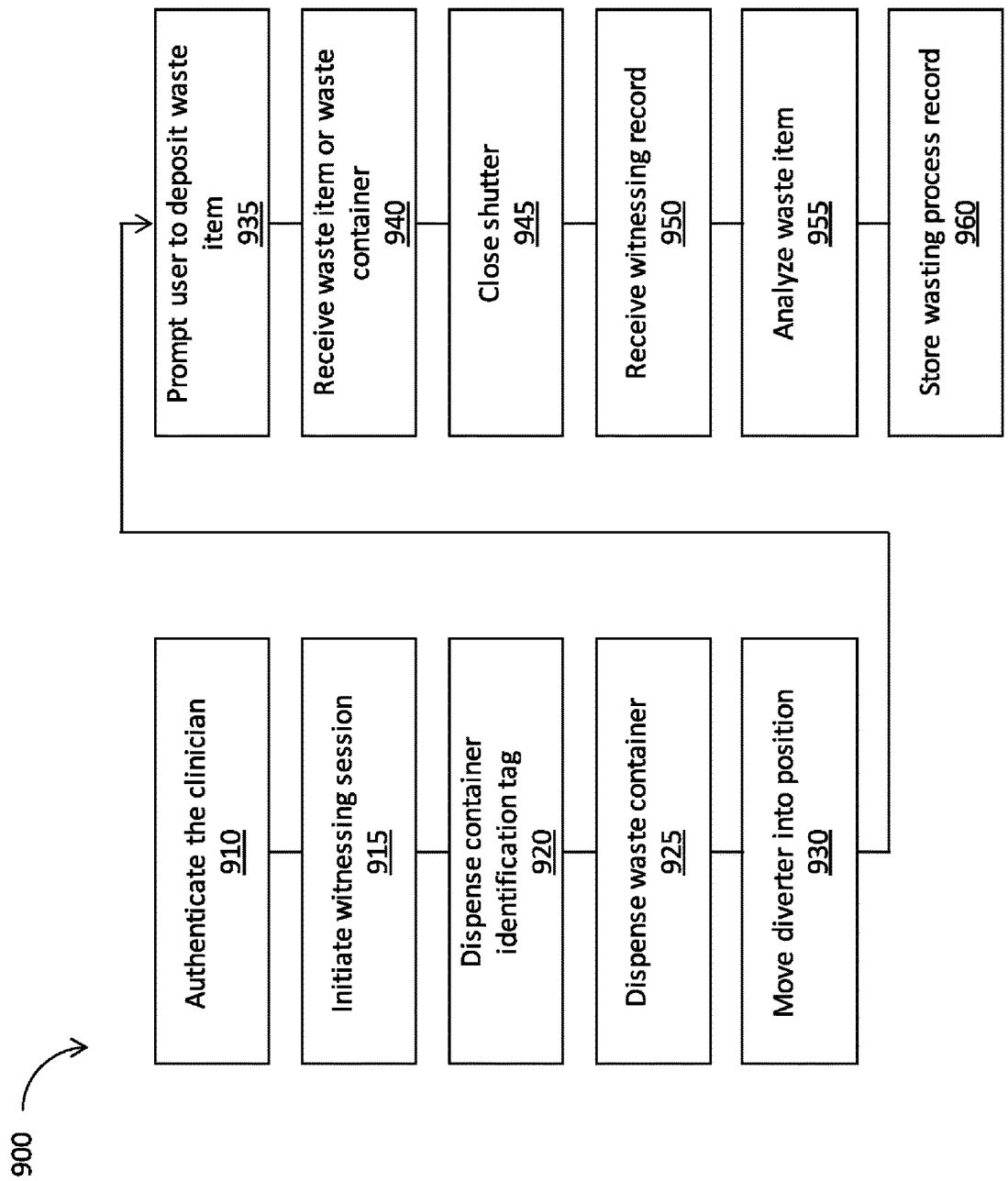
FIG. 9, FIG. 10A, and FIG. 10B are flowcharts illustrating processes consistent with implementations of the current subject matter.

FIG. 9 depicts a flowchart illustrating a process 900 consistent with implementations of the current subject matter. Referring to FIG. 9, at 910, the wasting station 110 may authenticate a user, such as the clinician 135 using the wasting station 110. The clinician 135 may be prompted to, for example, enter a user name and password, provide a fingerprint scan, provide a retina scan, swipe an employee card, or provide other information, for example, biometric information, to verify the clinician 135 is authorized to use the wasting station 100.

At 915, the wasting station 110 may initiate a witnessing session at the witnessing client 150. The decision to initiate the witnessing session may be random based on generating a pseudorandom number. The decision as to whether to initiate the witnessing session may be based in part on the identity of the clinician 135 accessing the wasting station 110. For example, the wasting station 110 may determine whether the clinician 135 should be witnessed based on a risk score associated with the clinician 135. For example, consistent with implementations of the current subject matter, each clinician 135 may have a risk score associated with him or her. The risk score may be based on various factors, for example, employment type, length of employment, history of wasting processes in which the clinician 135 has been involved, and/or age of the clinician 135. If the risk score exceeds a predetermined risk threshold, the wasting station 110 may determine that a wasting process performed by the clinician 135 should be witnessed. Alternatively or additionally, the decision may be based on a list of at-risk users. The list of at-risk users may be stored at the wasting station 110 or at the remote server 192. The wasting station 110 may receive the names and/or identifiers of the at-risk users from an authorized person via the user interface 130. The wasting station 110 may be communicatively coupled to a diversion analytics system. The wasting station 110 may receive the names and/or identifiers of the at-risk users from the diversion analytics system. Alternatively or additionally, the decision may be based on a duration since a previous witnessing session for the clinician 135, for example, if the duration exceeds a threshold duration. Alternatively or additionally, the decision may be based on a length of time since the medication is dispensed by a pharmacy or a medication dispensing station 194. To determine the length of time since the medication was dispensed, the wasting station 110 may receive the date and time the medication was dispensed from a computing device at the pharmacy, from the medication dispensing station 194, and/or from the remote server 192. Alternatively or additionally, the decision may be based on an availability of resources and/or resource capacity at the wasting station 110 to perform the witnessing. The resource availability and/or resource capacity may include, for example, video and/or image memory availability, availability of receiving containers and/or waste containers, bulk and/or audit container capacity, connectivity to a remote witnessing system, and/or the like. If no witnesses are available, the wasting station 110 may flag the wasting process for audit and/or utilize remote witnessing capabilities.

The wasting station 110 may include features to maintain integrity of the wasting and witnessing processes before initiating a session or when one or more features fail. The wasting station 110 may include a configuration file identifying operational state of elements needed for a wasting session. If the elements are not in the operational state the wasting station 110 may disable one or more aspects of the wasting process. Some elements may be controlled by the wasting station 110. In such instances, if the element is not in the specified state, the wasting station 110 may transmit a control signal to adjust the element to the required state. For example, if the configuration specifies that the wasting station 110 be connected to a specific network or have visibility to a specific network address, the wasting station 110 may transmit a message to activate a transceiver to connect to the specific address. Examples of other elements that may be required for specific configuration include a camera, a display, one or more sensors, a supply of wasting containers, or other element associated with the wasting station 110. A similar operational readiness verification may be performed by a witnessing client before establishing a connection therewith and then periodically during the witnessing session. If an event is detected that causes the operational state to violate the configuration (e.g., loss of network connectivity), the device may secure the wasting station until the appropriate state is achieved. For example, if the deposit point is unsecured and, while unsecured but before receiving the wasting container, network connectivity with the remote witnessing client is lost, the wasting station 110 may transmit a message to secure the deposit point until the connection is reestablished. The connection may be reestablished using a preconfigured connection protocol such as, or similar to, HTTP, FTP, session initiation protocol (SIP), real-time transport protocol (RTP), secure real-time transport protocol (SRTP), ITU-T H.323, or media gateway control protocol (MGCP). The state of the witnessing session may be stored by the wasting station 110 and used to continue an interrupted witnessing session. For example, an identifier for the witnessing session may be stored in a data store accessible to the device(s). One or more identifiers for the device(s), user(s), and witnessing step(s) performed or outstanding may be stored in association with the identifier. Reconstruction may include attempting to establish the connection between the devices associated with the session identifier (if the session was a remote witnessing session), confirming the user identities, and configuring the device(s) to perform the next required step.

At 920, the wasting station 110 may dispense a container identification tag, for example, a barcode label or an RFID tag. The wasting station 110 may instruct the clinician 135 to attach the identification tag to the direct waste 120 or to the waste container 125. The identification tag may be applied by the wasting station 110 when the direct waste 120 or the waste container 125 is deposited. Consistent with implementations of the current subject matter, the container identification tag may be linked to the clinician 135 for auditing and/or tracking purposes.

At 925, the wasting station 110 may dispense the waste container 125. The wasting station 110 may prompt the clinician 135 to place the waste item in the waste container 125. The waste container 125 may be dispensed within the housing of the wasting station 110. As such, the clinician 135 may not physically deposit the waste item into the waste container 125. Instead, the deposit may occur within the security of the housing of the wasting station 110.

At 930, the controller 230 may move a diverter, for example, the solid waste diverter 212 or the liquid waste diverter 222, into position. If the wasting process is being audited, the controller 230 may move the diverter into the audit position. If the wasting process is not being audited, the controller 230 may move the diverter into the bulk position.

At 935, the controller may open a cover, allowing the clinician 135 to access a deposit point, for example, the solid waste receiver 210 and/or the liquid direct waste receiver 220. The wasting station 110 may then prompt the clinician 135 to deposit or pour the direct waste 120 and/or the waste container 125 into the solid waste receiver 210 and/or the liquid direct waste receiver 220.

At 940, the wasting station 110 receives the direct waste 120 and/or the waste container 125. The direct waste 120 and/or the waste container 125 travels through the solid waste diverter 212 or the liquid waste diverter 222 and into the solid waste audit bin 216, the solid waste bulk bin 214, the liquid waste audit bin 226, or the liquid waste bulk bin 224, as determined by the position of the diverter 212 or 222.

At 945, the controller 230 closes the shutter and/or cover, thus preventing further access to the deposit points. Consistent with implementations of the current subject matter, the controller 230 may close the shutter and/or cover after a predetermined period of time has elapsed. The predetermined period of time may be chosen such that there is sufficient time to deposit the direct waste 120 and/or the waste container 125. The predetermined period of time may be based on the waste item being deposited. For example, if the waste container 125 is a bag that is being deposited, less time may be allotted than that for a vial of medication being directly emptied. The predetermined periods of time may be based on data indicating time allotments for various waste items.

At 950, the wasting station 110 may receive a witnessing record. The witnessing record may be received, at least in part, from the witnessing client 150. The witnessing record may include the identity of the witness 155 who witnessed the wasting process. The witnessing record may include information identifying whether the witnessing was local or remote. The witnessing record may include time data identifying when the witnessing was requested and how soon the witness confirmed the waste event. In some implementations, the witnessing record may be generated, at least in part, by the wasting station 110.

At 955, the wasting station 110 may analyze the waste 120. As described above, the controller 230 may transfer the direct waste 120 and/or the waste item from the waste container 125 from an audit container to the analysis module 242. The analysis module 242 may perform analysis and physical measurements of the direct waste 120 and/or the waste item from the waste container 125. For example, the analysis module 242 may perform Raman spectroscopy, refractometry, specific gravity measurements, density measurements, image analysis, and/or the like. Image analysis may include identification of medications based on, color, size, shape, markings, and/or the like.

At 960, the wasting station 110 may store a record of the wasting process. The record of the wasting process may include, for example, an identifier associated with the direct waste 120 and/or the waste container 125, the identity of the clinician 135 who deposited the direct waste 120 and/or the waste container 125, the witnessing record received from the witnessing client 150, video and/or still images of the wasting process, results of the analysis performed by the analysis module 242, and/or the like.

Figure 10A:
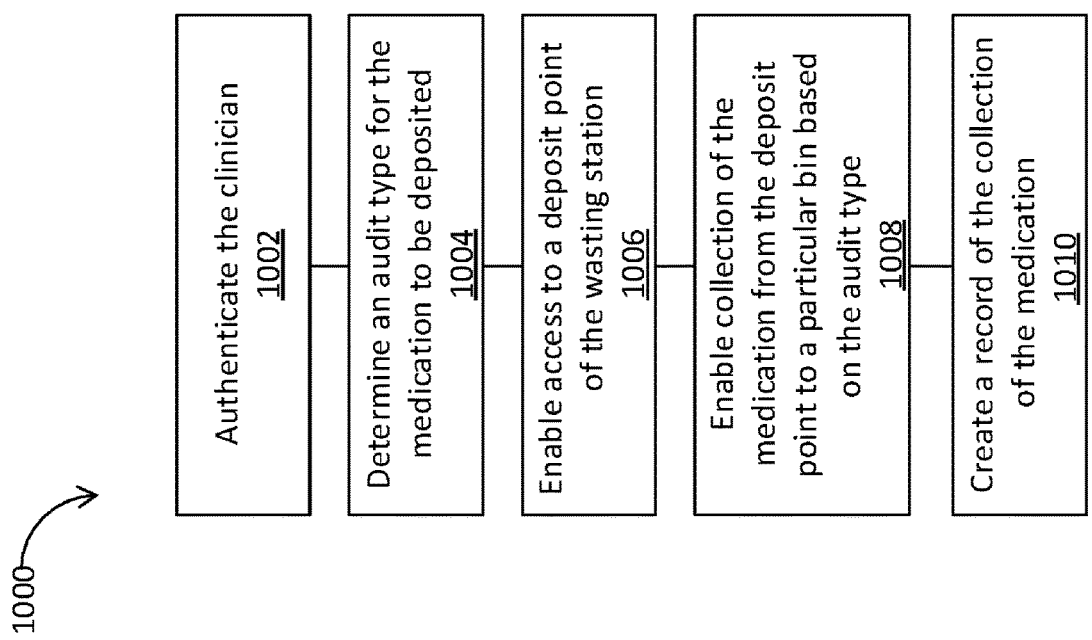

FIG. 10A depicts a flowchart illustrating a process 1000 consistent with implementations of the current subject matter. Referring to FIG. 10A, at 1002, the wasting station 110 may authenticate the clinician 135 or other personnel using the wasting station 110. Consistent with some implementations of the current subject matter, the authentication of the clinician 135 includes verifying an identity of the clinician 135 as an authorized user. The wasting station 110 may access data in, for example, the remote server 192 to make such a verification. Consistent with some implementations of the current subject matter, the authentication of the clinician 135 may further include identifying an access level of the clinician 135. Such identification may, for example, involve receiving data from the clinician 135 and consulting the remote server 192. The clinician 135 may be prompted to, for example, enter a user name and password via the user interface 130, provide a fingerprint scan, provide a retina scan, and/or the like. Alternatively and/or additionally, the clinician 135 may scan his or her badge using the badge reader 238.

At 1004, the wasting station 110 may determine an audit type for the medication to be deposited by the clinician 135 and collected by the wasting station 110. Consistent with implementations of the current subject matter, the audit type may be based on a set of predefined rules defined for the wasting station 110 and/or the clinician 135. The audit type may define whether the medication (e.g., the direct waste 120) is subject to an audit and should accordingly be directed to an audit bin. The set of predefined rules may define one or more criteria related to the wasting station 110 and/or the clinician 135 for determining if the medication is subject to the audit. For example, if the wasting station 110 is located at a facility where there is a pattern of diversion, the medication may more likely be audited compared to wasted medication at another facility. As another example, if the clinician 135 has been with the facility for less than a threshold period of time, or if the clinician is substituting at the facility, the wasted medication deposited by the clinician 135 may be subject to an audit. The predefined rules may be based on a list of at-risk users. The list of at-risk users may be stored at the wasting station 110 or at the remote server 192. The wasting station 110 may receive the names and/or identifiers of the at-risk users from an authorized user via the user interface 130. The wasting station 110 may be communicatively coupled to a diversion analytics system. The wasting station 110 may receive the names and/or identifiers of the at-risk users from the diversion analytics system. The predefined rules may be based on a duration since a previous witnessing session for the clinician 135, for example, if the duration exceeds a threshold duration. Alternatively or additionally, the decision may be based on a length of time since the medication was dispensed by a pharmacy or a medication dispensing station 194. To determine the length of time since the medication was dispensed, the wasting station 110 may receive the date and time the medication was dispensed from a computing device at the pharmacy, from the medication dispensing station 194, or from the remote server 192. Consistent with implementations of the current subject matter, the one or more criteria for determining if a medication to be wasted is subject to an audit may include a frequency of use, one or more attributes associated with the clinician 135, a medication type of the medication, a time of day, and/or a day of the week. The set of predefined rules may include a random auditing rule. If the random auditing rule is enabled, the wasting station may, from time to time (e.g. randomly), identify a wasting process as being subject to an audit, even if that particular wasting process would not otherwise be flagged for an audit, for example, based on one or more of the other predefined rules. If a wasting process is subject to an audit, the wasted medication may be stored in an audit bin 216, 226, and/or analyzed by the analysis module 242. If the wasting process is not subject to an audit, the wasted medication may be stored in a bulk bin 214, 224. For example, consistent with implementations of the current subject matter, the audit type may be based on a medication type of the medication. For example, certain medication types may be flagged such that they are always subject to an audit.

At 1006, the wasting station 110 may enable access to a deposit point of the wasting station 110. For example, the controller 230 may open one or more moveable covers and/or shutters to provide access to the solid waste receiver 210 and/or the liquid direct waste receiver 220. The deposit point for the medication may be selected from a plurality of deposit points based on a medication type of the medication.

With continued reference to FIG. 10A, at 1008, the wasting station 110 may enable collection of the medication from the deposit point to a particular container or bin based on the determined audit type. Consistent with implementations of the current subject matter, the enablement of collection of the medication may include opening a pathway from the deposit point to the particular container for directing the medication to the particular container. For example, the controller 230 may move the solid waste diverter 212 into either a solid bulk position or a solid audit position; or the controller may move the liquid waste diverter 222 into either a liquid bulk position or a liquid audit position.

At 1010, the wasting station 110 may create a record of the collection of the medication. For example, information related to the clinician 135, the medication, and/or the collection process (e.g., direct waste or waste container, audit or bulk collection, time, date, etc.) may be part of the record. Consistent with implementations of the current subject matter, the record of the wasting process may include, for example, an identifier associated with the direct waste 120 and/or the waste container 125, the identity of the clinician 135 who deposited the direct waste 120 and/or the waste container 125, the witnessing record received from the witnessing client 150, video and/or still images of the wasting process, results of the analysis performed by the analysis module 242, and/or the like.

Consistent with implementations of the current subject matter, the medication type of the medication to be wasted and/or deposited at the wasting station 110 may be associated with the clinician 135. For example, the wasting station 110 may communicate with the medication dispensing station 194 and may track the medication dispensed to the clinician 135. When the clinician 135 is authenticated at the wasting station 110, the wasting station 110 may know the medication that has been dispensed to the clinician 135. Consistent with implementations of the current subject matter, the wasting station 110 may determine the medication type by receiving a medication identifier, from, for example, a scanning device such as a barcode reader or scanner, associated with the medication.

Consistent with implementations of the current subject matter, the wasting station 110 may enable access to the waste container 125 for depositing the waste container at the deposit point for the collection of the medication at the wasting station 110. For example, enablement of access to the waste container 125 may include dispensing, from the wasting station 110, the waste container 125 or otherwise providing access to the waste container 125. Consistent with implementations of the current subject matter, the waste container 125 may include an identification code, for example, a container identifier code. The wasting station 110 may receive the container identifier code for tracking and auditing purposes from a scanning device from the clinician 135 or automatically upon providing access to the waste container 125. For example, prior to granting access to the waste container or when access is granted, the wasting station 110 may initiate a reading of the container identifier code to be added to the record associated with the waste process.

Consistent with implementations of the current subject matter, the wasting station 110 may determine that collection of the medication in the audit bin or bulk bin is completed. Such a determination may be made based on weight or other parameter of the audit bin or bulk bin, or from a sensor signal provided to the controller 230. Upon a determination that the collection of the medication is made, the wasting station 110 may secure the deposit point to prevent access to the deposit point. For example, the controller 230 may close the one or more moveable covers and/or shutters.

Consistent with implementations of the current subject matter, the wasting station 110 may provide access to the solid waste audit bin 216, the solid waste bulk bin 214, the liquid waste audit bin 226, and/or the liquid waste bulk bin 224. The access may be provided by the wasting station 110 to an authenticated personnel, for example, the clinician 135 or the auditor 160.

Figure 10B:
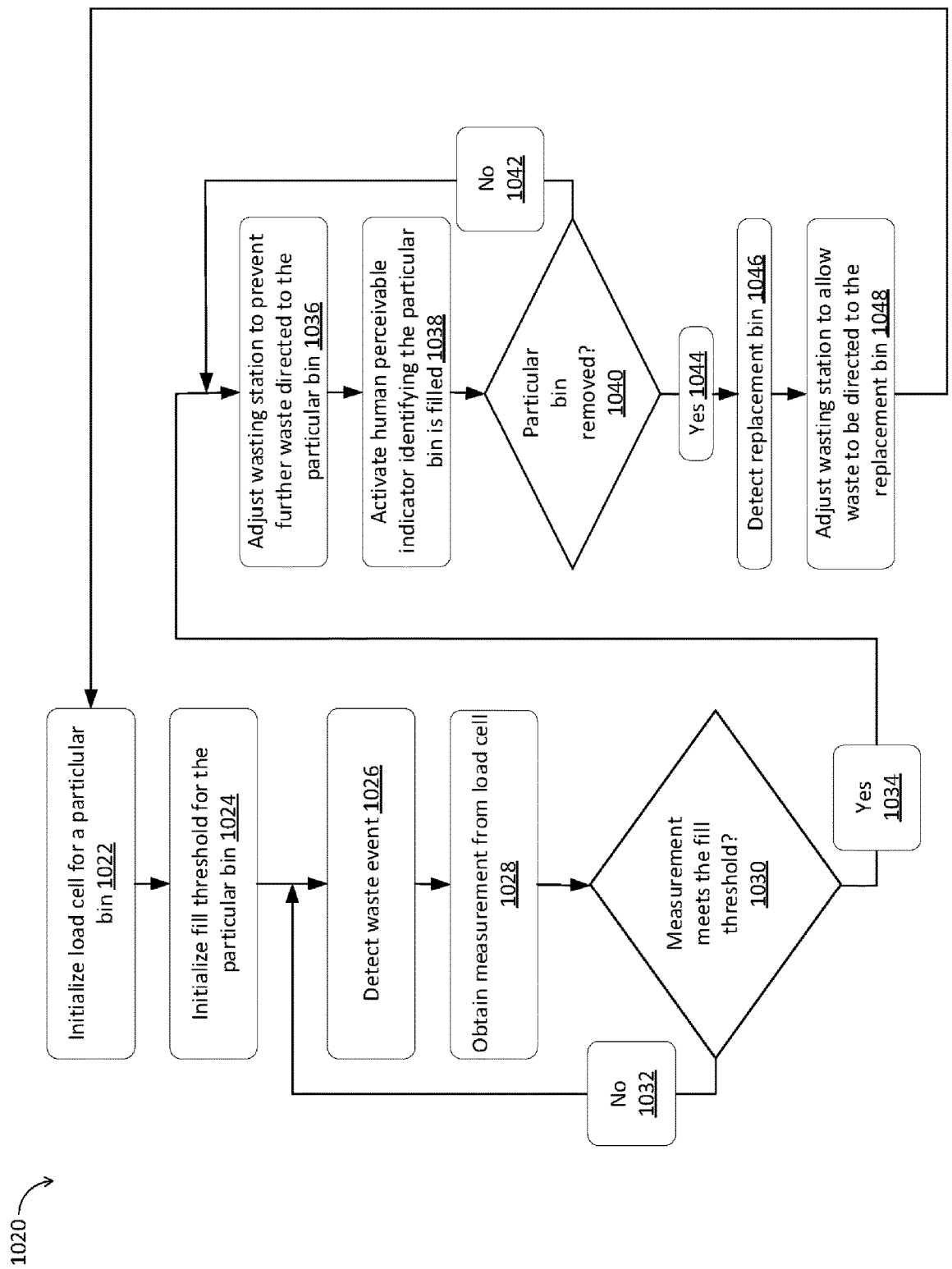

FIG. 10B depicts a flowchart illustrating a process 1020 consistent with implementations of the current subject matter. The wasting station 110 may monitor a sensor to detect the amount of waste material stored in the waste storage bin 452. If the waste storage bin 452 becomes full, the wasting station may alert a user. The sensor may include the load cell 252, an optical sensor, a photocell, a light curtain, a fluid level detector, a camera, and/or the like. The wasting station 110 may monitor the same or a different sensor to detect whether the waste storage bin 452 is present, allowing the wasting station 110 to detect when the waste storage bin 452 is removed and when a replacement bin is installed.

At 1022, the controller 230 may initialize the load cell 252. For example, the controller 230 may initialize the load cell 252 by configuring the load cell circuit 454 to apply a fixed reference voltage to an analog-to-digital converter of the load cell circuit 454. The controller 230 may read a digital value from the analog-to-digital converter. The controller 230 may create a calibration curve for the analog-to-digital converter. The calibration curve may be based on the applied reference voltage, an expected digital value for the reference voltage, and the digital value read from the analog-to-digital converter. Alternatively, if the load cell 252 is part of a smart sensor, the controller 230 may send an initialization command to the smart sensor, causing the smart sensor to perform a self-test, self-calibration, initialization, and/or the like. The waste storage bin 452 may include a waste bin tag. The waste bin tag may be included in the waste storage bin 452, attached to the waste storage bin 452, and/or the like. The waste bin tag may include waste bin information, including a waste bin identifier, an empty mass of the waste bin, an empty volume of the waste bin, a capacity of the waste bin, a fill threshold of the waste bin, and/or the like. The waste bin tag may include an RFID tag, a BLE beacon, a short range radio, a barcode, and/or the like. During initialization, the controller 230 may detect that a particular waste bin is present, read the waste bin information from the waste bin tag, and/or the like.

At 1024, the controller 230 may initialize a fill threshold for the particular waste storage bin. The fill threshold may indicate the amount of waste that can be stored in the particular waste storage bin before it is considered full. The controller 230 may dynamically identify what the value(s) to trigger a "fill" state for a given waste storage bin. The controller 230 may zero the load cell 252, which may include establishing a tare weight for the waste storage bin 452. The controller 230 may activate one or more sensors to detect the fill state for the particular waste storage bin. If the particular waste storage bin is made from an opaque material, the controller 230 may activate the load cell 252, the fluid level detector, and/or the like. If the particular waste storage bin is made from a transparent, translucent, or non-opaque material, the controller 230 may activate the optical sensor, light curtain, photocell, camera, and/or the like. The fill threshold may include a quantity of solid waste items, a volume of liquid waste, a mass of waste material, and/or the like. The controller 230 may determine a separate fill threshold for each sensor that is used to detect the fill state for the particular storage bin, such as a first fill threshold for the load cell 252 and a second fill threshold for the optical sensor. To conserve resources, if a sensor is not being used to detect the fill state, that sensor may be deactivated. The controller 230 may obtain the fill threshold from the waste bin tag, a memory of the wasting station, a server, and/or the like. The fill threshold may be stored in a memory of the wasting station, and may be associated with a waste storage bin identifier. If the controller 230 detects an identifier for a particular waste storage bin, the controller 230 may search the memory for the waste storage bin identifier to obtain the fill threshold. Alternatively and/or additionally, the controller 230 may obtain a fill threshold range from the waste bin tag, the memory of the wasting station, the server, and/or the like. In response to obtaining the fill threshold for a particular storage bin, the controller 230 may store the fill threshold in a secure memory to reduce the likelihood of intentional and/or unintentional disruption to the wasting process. The fill threshold range may include an upper limit and a lower limit. The controller 230 may generate a pseudo-random fill threshold that is within the fill threshold range. The pseudo-random fill threshold may reduce the predictability of waste storage bin exchanges by introduce some amount of variability in the cadence for replacing waste storage bins. As such, the pseudo-random fill threshold may provide an additional deterrent to diversion activity. The controller 230 may initiate a sensing cadence for the waste bin container 452. The sensing cadence may determine time periods when the controller 230 uses one or more sensors to detect the amount of waste material in the waste storage bin 452 and other time periods when the controller 230 disables the one or more sensors, for example, to conserve resources. For example, the controller 230 may activate the load cell 252 every minute, every 10 minutes, every 30 minutes, every hour, every day, and/or the like. The controller 230 may base the sensing cadence on the type of waste storage bin. For example, the controller 230 may select a sensing cadence of every 10 minutes for a liquid waste storage bin and a sensing cadence of every hour for a solid waste storage bin. The controller 230 may activate the load cell 252 in response to an event. The controller 230 may activate the load cell 252 in response to detecting that a drawer, a panel, or another element of the wasting station is opened, closed, moved, and/or the like.

At 1026, the controller 230 may detect a waste event. As described with respect to FIG. 9, the waste event may include receiving a waste container and/or direct waste at the deposit point of the wasting station. During the waste event, the waste container and/or direct waste may be stored in one of the waste storage bins, and the controller 230 may produce a record of the waste event.

At 1028, the controller 230 may obtain a load cell measurement from the load cell 252 associated with the particular waste bin. The controller 230 may read a raw value from an analog-to-digital converter of the load cell circuit 454. The raw value may correspond to the force and/or torque applied to the load cell 252. The controller 230 may read an analog-to-digital converter of the load cell circuit 454 to obtain a temperature sensor value. The controller 230 may, based on the raw value and the temperature sensor value, apply temperature compensation to produce a compensated raw value. The controller 230 may, based on the compensated raw value, apply a digital filter to produce a filtered raw value. The digital filter may include an infinite impulse response filter, a finite impulse response filter, and/or the like. The controller 230 may, based on the filtered raw value and a calibration curve, produce the load cell measurement in standard units, such as Newtons, Newton-meters, kilograms, and/or the like. Alternatively and/or additionally, if the load cell 252 is part of a smart sensor, the controller 230 may obtain the load cell measurement from the smart sensor via a wired or wireless connection between the controller 230 and the smart sensor. The wired or wireless connection may include an RS-232 connection, an RS-485 connection, a USB connection, an IEEE 802.1 connection, a BLE radio, an IEEE 802.11 radio, an IEEE 802.15.4 radio, and/or the like.

The load cell measurement may indicate a current mass of the particular waste bin, including any waste material and/or waste containers stored in it. Alternatively and/or additionally, the controller 230 may obtain a current waste level for the particular waste bin by monitoring a light curtain, a fluid level detector, an optical sensor, a camera, and/or the like.

At 1030, the controller 230 may compare the load cell measurement and the fill threshold associated with the particular waste bin. If, at 1032, the controller 230 determines that the load cell measurement is less than the fill threshold, the controller 230 may continue, at 1026, to wait for the next waste event.

If, at 1034, the controller 230 determines that the load cell measurement meets the fill threshold, at 1036, the controller 230 may make adjustments to the wasting station to prevent further waste from being directed to the particular waste bin until the waste bin is emptied or replaced. To prevent the particular waste bin from overflowing, the controller 230 may direct further waste deposits to a different waste bin, close one or more deposit points, block access to one or more deposit points, and/or the like. For example, if the solid waste bulk bin 214 is full, the controller 230 may direct further solid waste events to the solid waste audit bin 216. Similarly, if the liquid waste bulk bin 224 is full, the controller 230 may direct further liquid waste events to the liquid waste audit bin 226. In response to detecting that the particular waste bin is full, the controller 230 may lock a door or other element of the wasting station to prevent receiving additional waste material. The controller 230 may seal or otherwise secure the particular waste storage bin. The controller 230 may seal or secure the particular waste storage bin before a drawer or panel of the wasting station is allowed to be opened to remove the container. Additional security of the wasted material may be provided by sealing and/or securing the particular waste storage bin in response to detecting that the particular waste storage bin is full. In response to detecting that the particular waste storage bin is full, the controller 230 may adjust a power state for the wasting station and/or elements of the wasting station. The controller 230 may disable and/or reduce the electrical power associated with sensors associated with the particular waste storage bin, such as the load cell 252, the optical sensor, the photocell, the light curtain, the camera, and/or the like. In response to detecting that the particular waste storage bin is full, the controller 230 may adjust an element of the wasting station to provide access to allow an authorized user to remove the particular waste storage bin. The element may include a user interface element, a button, a panel, a handle and/or the like. The element may include elements used to collection user information and/or authorize access, such as a username, password, biometrics, information encoded on a card, and/or scanners for other devices or media.

At 1038, in response to determining that the particular waste bin is full, the controller 230 may activate a human perceivable indicator identifying the particular waste bin. The human perceivable indicator may include a light, a sound, a message, a user interface display and/or the like. For example, the controller 230 may illuminate an LED to indicate the particular waste bin is full. In response to detecting that the particular waste bin is full, the controller 230 may adjust a user interface display to provide information about an alternative wasting station that could receive the waste material. Alternatively and/or additionally, the wasting station may send, via a network and to a designated computing device, a message indicating that the particular waste bin is full. The designated computing device may include a mobile phone, a tablet, a laptop computer and/or the like. The designated computing device may receive the message from the wasting station and alert a user who is authorized to empty and/or replace waste bins in the wasting station 110.

At 1040, the controller 230 may a monitor bin sensor to detect whether the particular waste bin is removed. The bin sensor may include the load cell 252, a limit switch, a proximity sensor, a Hall effect sensors, a photo cell, a camera, and/or the like. If, at 1042, the controller 230 detects that the particular waste bin has not been removed, the controller 230 may continue, at 1036, to prevent further waste from being directed to the particular waste bin.

If, at 1044, the controller 230 detects that the particular bin has been removed, the wasting station may, at 1046, continue to monitor the bin sensors to detect when a replacement bin is available.

At 1048, in response to detecting that a replacement bin is available, the controller 230 may make adjustments to the wasting station 110. The adjustments may allow waste to be directed to the replacement waste bin. For example, the controller 230 may open and/or unblock access to some and/or all of the deposit points to allow waste material to be directed to the replacement waste bin.

In response to adjusting the wasting station at 1048, the controller 230 may initialize the load cell 252 for the replacement waste bin, as described above with respect to 1022.

Aspects of the current subject matter provide for secure, safe, and automated disposal of wasted medication at a wasting station. The wasting process consistent with implementations of the current subject matter provides for anonymous auditing, thereby providing an incentive for a user to comply with wasting protocols. The wasting process may be remotely witnessed and may be tracked and recorded for future review. The wasting station may also include various analysis capabilities to analyze the wasted medication.

Figure 11:
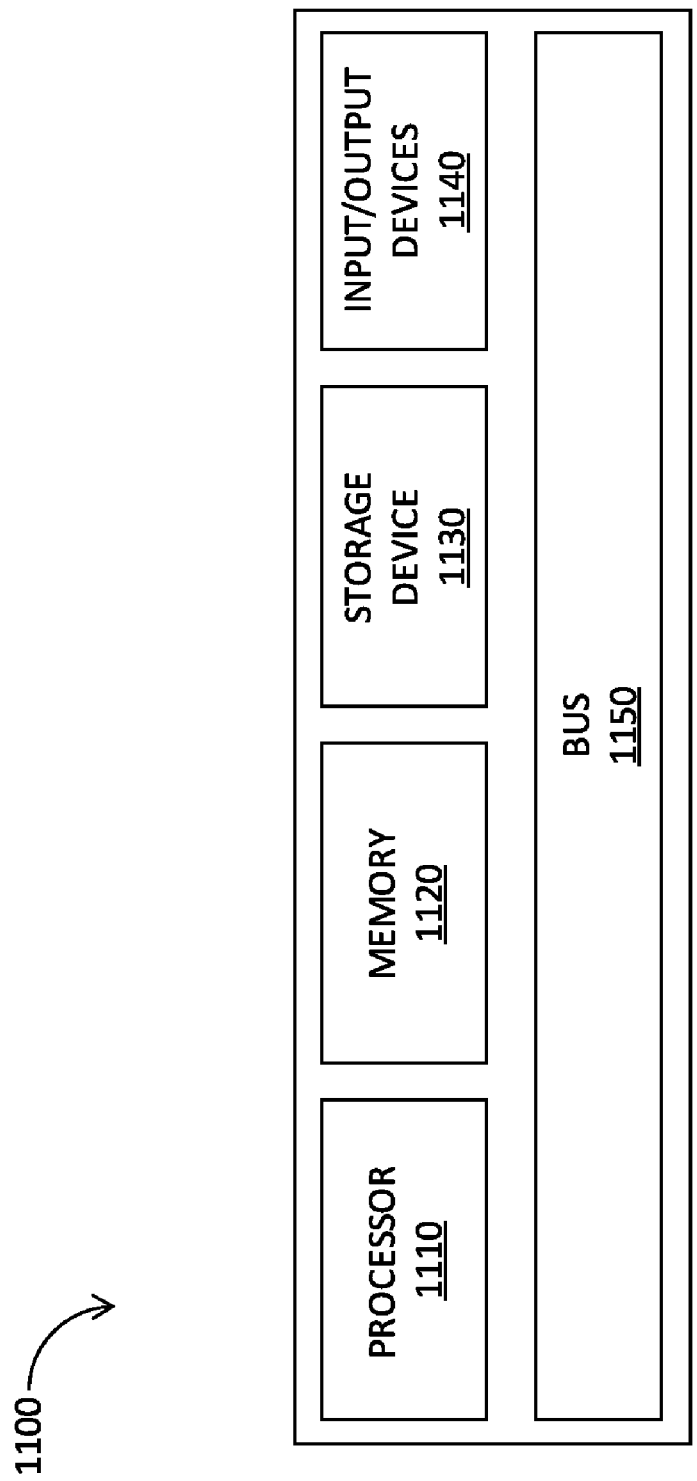
FIG. 11 depicts a block diagram illustrating a computing system consistent with implementations of the current subject matter.

FIG. 11 depicts a block diagram illustrating a computing system 1100 consistent with implementations of the current subject matter. Referring to FIG. 1A, FIG. 1B, and FIG. 2, the computing system 1100 may be used to implement one or more components of the wasting system 100, for example, the various components of the wasting station 110.

As shown in FIG. 11, the computing system 1100 may include a processor 1110, a memory 1120, a storage device 1130, and input/output device 1140. The processor 1110, the memory 1120, the storage device 1130, and the input/output device 1140 may be interconnected via a system bus 1150. The processor 1110 is capable of processing instructions for execution within the computing system 1100. Such executed instructions may implement one or more components of the wasting system 100, for example, the wasting station 110. In some example embodiments, the processor 1110 may be a single-threaded processor. Alternatively, the processor 1110 may be a multi-threaded processor. The processor 1110 is capable of processing instructions stored in the memory 1120 and/or on the storage device 1130 to display graphical information for a user interface provided via the input/output device 1140.

The memory 1120 is a computer readable medium such as volatile or non-volatile that stores information within the computing system 1100. The memory 1120 may store data structures representing configuration object databases, for example. The storage device 1130 is capable of providing persistent storage for the computing system 1100. The storage device 1130 may be a floppy disk device, a hard disk device, an optical disk device, a tape device, a solid-state device, and/or any other suitable persistent storage means. The input/output device 1140 provides input/output operations for the computing system 1100. In some implementations, the input/output device 1140 includes a keyboard and/or pointing device. In various implementations, the input/output device 1140 includes a display unit for displaying graphical user interfaces.

According to some implementations, the input/output device 1140 may provide input/output operations for a network device. For example, the input/output device 1140 may include Ethernet ports or other networking ports to communicate with one or more wired and/or wireless networks (e.g., a local area network (LAN), a wide area network (WAN), the Internet).

In some implementations, the computing system 1100 may be used to execute various interactive computer software applications that may be used for organization, analysis, and/or storage of data in various formats. Alternatively, the computing system 1100 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 1140. The user interface may be generated and presented to a user by the computing system 1100 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, for example as would a non-transient solid-state memory or a magnetic hard drive or any equivalent storage medium. The machine-readable medium may alternatively or additionally store such machine instructions in a transient manner, for example, as would a processor cache or other random access memory associated with one or more physical processor cores.

To provide for interaction with a user, one or more aspects or features of the subject matter described herein may be implemented on a computer having a display device, for example a cathode ray tube (CRT) or a liquid crystal display (LCD) or a light emitting diode (LED) monitor for displaying information to the user and a keyboard and a pointing device, for example a mouse or a trackball, by which the user may provide input to the computer. Other kinds of devices may be used to provide for interaction with a user as well. For example, feedback provided to the user may be any form of sensory feedback, for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Although the disclosure, including the figures, described herein may describe and/or exemplify different variations separately, it should be understood that all or some, or components of them, may be combined.

Although various illustrative embodiments are described above, any of a number of changes may be made to various embodiments. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for illustrative purposes and should not be interpreted to limit the scope of the claims.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. References to a structure or feature that is disposed "adjacent" another feature may have portions that overlap or underlie the adjacent feature.

Terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative tennis, such as, for example, "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims which follow, unless the context requires otherwise, the word "comprise" and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, are possible.

In the descriptions above and in the claims, phrases such as, for example, "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

As used herein a "user interface" (also referred to as an interactive user interface, a graphical user interface or a UI) may refer to a network based interface including data fields and/or other control elements for receiving input signals or providing electronic information and/or for providing information to the user in response to any received input signals. Control elements may include dials, buttons, icons, selectable areas, or other perceivable indicia presented via the UI that, when interacted with (e.g., clicked, touched, selected, etc.), initiates an exchange of data for the device presenting the UI. A UI may be implemented in whole or in part using technologies such as hyper-text mark-up language (HTML), FLASH™, JAVA™, .NET™, web services, or rich site summary (RSS). In some embodiments, a UI may be included in a stand-alone client (for example, thick client, fat client) configured to communicate (e.g., send or receive data) in accordance with one or more of the aspects described. The communication may be to or from a medical device or server in communication therewith.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As user herein, the terms "correspond" or "corresponding" encompasses a structural, functional, quantitative and/or qualitative correlation or relationship between two or more objects, data sets, information and/or the like, preferably where the correspondence or relationship may be used to translate one or more of the two or more objects, data sets, information and/or the like so to appear to be the same or equal. Correspondence may be assessed using one or more of a threshold, a value range, fuzzy logic, pattern matching, a machine learning assessment model, or combinations thereof.

In any embodiment, data generated or detected can be forwarded to a "remote" device or location, where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method, comprising:
   authenticating, by a processing unit associated with a wasting station, a user, wherein the wasting station comprises a container dispenser configured to dispense a waste container to hold a medication and a label dispenser configured to dispense a label to adhere to the medication or to the waste container, and wherein the wasting station comprises one or more diverters to divert the medication to a selected container along a pathway, the one or more diverters comprising a mechanical structure and an actuator configured to move the mechanical structure;
   determining, by the processing unit, if the medication is subject to an audit based on an audit type, wherein the medication is to be deposited by the user and collected by the wasting station, and wherein the audit type is determined based on a set of predefined rules defined for the wasting station or the user;
   providing, by the processing unit, an opening to access a deposit point of the wasting station, the deposit point being connectable to a plurality of containers defining collection compartments of the wasting station;
   opening, by the processing unit, the pathway for a collection of the medication from the deposit point to the selected container of the plurality of containers, wherein the selected container is based on the audit type;
   determining, by the processing unit, to initiate a witnessing session using a camera on the wasting station based on generating a pseudorandom number;
   transferring the medication from the selected container to an analysis module to perform an analysis of the medication; and
   creating, by the processing unit, a record of the collection and the analysis of the medication.

2. The computer-implemented method of claim 1, further comprising:
   storing the medication in an audit bin in response to determining that the medication is subject to the audit; and
   storing the medication in a bulk bin in response to determining that the medication is not subject to the audit.

3. The computer-implemented method of claim 1, wherein if a clinician is suspected of diverting medications, the selected container is flagged for the audit.

4. The computer-implemented method of claim 3, wherein the set of predefined rules define one or more criteria related to the wasting station or the user, and wherein the one or more criteria comprises a frequency of use, one or more attributes associated with the user, a list of at-risk users, a medication type of the medication, a length of time since the medication was dispensed, a time of day, and a day of a week.

5. The computer-implemented method of claim 3, wherein the set of predefined rules include a random auditing rule for determining whether the medication is subject to the audit.

6. The computer-implemented method of claim 1, further comprising:
   receiving, by the processing unit, a medication identifier associated with the medication; and
   determining, by the processing unit and based on the medication identifier, a medication type, wherein the medication type is linked to the medication identifier, wherein the medication type is associated with the user, and wherein the audit type is further based on the medication identifier or the medication type of the medication.

7. The computer-implemented method of claim 6, wherein the deposit point is selected from a plurality of deposit points based on the audit type.

8. The computer-implemented method of claim 1, further comprising:
   dispensing, from the wasting station, the waste container, wherein the waste container is deposited at the deposit point for the collection of the medication, wherein the waste container comprises a container identifier code, and wherein the computer-implemented method further comprises receiving, by the processing unit, the container identifier code from a scanning device associated with the wasting station.

9. The computer-implemented method of claim 1, wherein the waste container further comprises a controller and a diverter, and wherein the computer-implemented method further comprises:
   moving, by the controller, the diverter into an audit position if a wasting process is being audited; and
   moving, by the controller, the diverter into a bulk position if the wasting process is not being audited.

10. The computer-implemented method of claim 1, wherein the selected container of the wasting station comprises a seal that provides an evidence of the opening to the deposit point for depositing the medication, and wherein the pathway directs the medication from the deposit point to the selected container.

11. The computer-implemented method of claim 1, further comprising determining whether a wasting process performed by a clinician should be witnessed based on a risk score associated with the clinician.

12. The computer-implemented method of claim 1, further comprising:
   determining, by the processing unit, the collection of the medication at the selected container; and
   securing, by the processing unit and based on the determination of the collection of the medication, the deposit point, wherein the securing prevents access to the deposit point.

13. The computer-implemented method of claim 1, further comprising:
   providing, by the processing unit and in response to verification of an authorized user, access to the plurality of containers.

14. The computer-implemented method of claim 1, wherein the medication is subject to the audit when a duration since a previous witnessing session exceeds a threshold duration.

15. The computer-implemented method of claim 1, wherein the wasting station further comprises a load cell, and wherein the computer-implemented method further comprises:
   obtaining, by the processing unit and from the load cell, a measurement associated with the selected container;
   comparing, by the processing unit, the measurement and a fill threshold associated with the selected container; and
   in response to determining that the measurement meets the fill threshold associated with the selected container, preventing, by the processing unit, further medication from being directed to the selected container.

16. A system, comprising:
   a wasting station configured to receive and collect medication, wherein the wasting station comprises a container dispenser configured to dispense a waste container to hold a medication and a label dispenser configured to dispense a label to adhere to the medication or to the waste container, and wherein the wasting station comprises one or more diverters to divert the medication to a selected container along a pathway, the one or more diverters comprising a mechanical structure and an actuator configured to move the mechanical structure;

at least one data processor associated with the wasting station; and at least one memory storing instructions which, when executed by the at least one data processor, result in operations comprising:

authenticating a user;

determining if the medication is subject to an audit based on an audit type, wherein the medication is to be deposited by the user and collected by the wasting station, and wherein the audit type is determined based on a set of predefined rules defined for the wasting station or the user;

providing an opening to access a deposit point of the wasting station, the deposit point being connectable to a plurality of containers defining collection compartments of the wasting station;

opening the pathway for a collection of the medication from the deposit point to the selected container of the plurality of containers, wherein the selected container is based on the audit type;

determining to initiate a witnessing session using a camera on the wasting station based on generating a pseudorandom number;

transferring the medication from the selected container to an analysis module to perform an analysis of the medication; and creating a record of the collection and an analysis of the medication.

17. The system of claim 16, wherein the wasting station is communicatively coupled with a witnessing client, wherein the witnessing client provides for remote monitoring at the wasting station, and wherein the wasting station provides a perceivable indication on a display of the witnessing client when a secure session has been established between the wasting session and the witnessing client.

18. The system of claim 17, wherein the wasting station is configured to encode time information into data captured during the secure session to confirm temporal synchronization between the wasting station and the witnessing client.

19. The system of claim 16, wherein the analysis module is configured to analyze the medication by performing Raman spectroscopy or refractometry to determine properties of the medication.

20. A system, comprising:

a wasting station configured to receive and collect medication wherein the wasting station is communicatively coupled with a witnessing client, wherein the witnessing client provides for remote monitoring at the wasting station, and wherein the wasting station provides a perceivable indication on a display of the witnessing client when a secure session has been established between the wasting session and the witnessing client and wherein the wasting station is configured to encode time information into data captured during the secure session to confirm temporal synchronization between the wasting station and the witnessing client;

at least one data processor associated with the wasting station; and at least one memory storing instructions which, when executed by the at least one data processor, result in operations comprising:

authenticating a user;

determining if the medication is subject to an audit based on an audit type, wherein the medication is to be deposited by the user and collected by the wasting station, and wherein the audit type is determined based on a set of predefined rules defined for the wasting station or the user;

providing an opening to access a deposit point of the wasting station, the deposit point being connectable to a plurality of containers defining collection compartments of the wasting station;

opening a pathway for a collection of the medication from the deposit point to a selected container of the plurality of containers, wherein the selected container is based on the audit type;

determining to initiate a witnessing session using a camera on the wasting station based on generating a pseudorandom number;

transferring the medication from the selected container to an analysis module to perform an analysis of the medication; and creating a record of the collection and an analysis of the medication.

* * * * *